(12) United States Patent
Figiel

(10) Patent No.: US 9,816,232 B2
(45) Date of Patent: Nov. 14, 2017

(54) MONITORING UPSTREAM MACHINE WIRES AND FELTS

(71) Applicant: INTERNATIONAL PAPER COMPANY, Memphis, TN (US)

(72) Inventor: Kerry D. Figiel, Cincinnati, OH (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 0 days.

(21) Appl. No.: 14/735,655

(22) Filed: Jun. 10, 2015

(65) Prior Publication Data

US 2016/0362837 A1     Dec. 15, 2016

(51) Int. Cl.
| | |
|---|---|
| D21F 3/08 | (2006.01) |
| D21F 3/06 | (2006.01) |
| D21F 3/02 | (2006.01) |
| D21F 7/06 | (2006.01) |
| D21G 9/00 | (2006.01) |
| G01L 5/00 | (2006.01) |

(52) U.S. Cl.
CPC .............. *D21F 3/06* (2013.01); *D21F 3/0209* (2013.01); *D21F 3/08* (2013.01); *D21F 7/06* (2013.01); *D21G 9/0036* (2013.01); *G01L 5/0085* (2013.01)

(58) Field of Classification Search
CPC .................................. D21F 11/00; D21F 7/06
USPC .................................................. 162/198, 263
See application file for complete search history.

(56) References Cited

U.S. PATENT DOCUMENTS

| | | |
|---|---|---|
| 757,221 A | 4/1904 | Partridge |
| 2,300,909 A | 11/1942 | Broughton |
| 3,622,448 A | 11/1971 | Adams et al. |
| 3,673,865 A | 7/1972 | Michaelsen |
| 3,794,427 A | 2/1974 | Shibata et al. |
| 3,840,302 A | 10/1974 | Brunton et al. |

(Continued)

FOREIGN PATENT DOCUMENTS

| | | |
|---|---|---|
| CN | 1782223 A | 6/2006 |
| CN | 1989294 A | 6/2007 |

(Continued)

OTHER PUBLICATIONS

Sasaki et al., In-Roll Stress Analysis Considering Air-Entrainment at the Roll-Inlet with the Effect of Grooves on Nip Roll Surface, 2008, pp. 133-145, vol. 2, No. 1, Journal of Advanced Mechanical Design, Systems and Manufacturing.

*Primary Examiner* — Mark Halpern
(74) *Attorney, Agent, or Firm* — Thomas W. Barnes, III

(57) ABSTRACT

Collecting data includes generating a sensor signal from each of a plurality of sensors located on a sensing roll, wherein each signal is generated when each sensor enters a region of a nip between the sensing roll and mating roll during each rotation of the sensing roll; wherein a web of material travels through the nip and a continuous band contacts a region of the web of material upstream from or at the nip. A periodically occurring starting reference is generated associated with each rotation of the continuous band and the signal generated by each sensor is received so that the one of the plurality of sensors which generated this signal is determined and one of a plurality of tracking segments associated with the continuous band is identified. The signal is stored to associate the respective sensor signal with the identified one tracking segment.

15 Claims, 27 Drawing Sheets

(56) References Cited

U.S. PATENT DOCUMENTS

| | | |
|---|---|---|
| 3,863,453 A | 2/1975 | Mercier |
| 3,936,665 A | 2/1976 | Donoghue |
| 3,989,085 A | 11/1976 | Crosby |
| 4,019,066 A | 4/1977 | Lucas et al. |
| 4,059,794 A | 11/1977 | Furness et al. |
| 4,092,068 A | 5/1978 | Lucas et al. |
| 4,152,202 A | 5/1979 | DeLigt |
| 4,233,011 A | 11/1980 | Bolender et al. |
| 4,423,636 A | 1/1984 | Plante |
| 4,495,587 A | 1/1985 | Plante et al. |
| 4,509,237 A | 4/1985 | Volz et al. |
| 4,524,546 A | 6/1985 | Hoover et al. |
| 4,729,153 A | 3/1988 | Pav et al. |
| 4,879,471 A | 11/1989 | Dahlquist |
| 4,898,012 A | 2/1990 | Jones et al. |
| 4,903,528 A | 2/1990 | Balakrishnan et al. |
| 4,921,574 A | 5/1990 | Hu |
| 4,947,684 A | 8/1990 | Balakrishnan |
| 5,022,966 A | 6/1991 | Hu |
| 5,048,353 A | 9/1991 | Justus |
| 5,121,332 A | 6/1992 | Balakrishnan et al. |
| 5,122,963 A | 6/1992 | Chen |
| 5,125,746 A | 6/1992 | Lipshitz |
| 5,358,606 A | 10/1994 | Makkonen |
| 5,379,652 A | 1/1995 | Allonen |
| 5,383,371 A | 1/1995 | Laitinen |
| 5,400,258 A | 3/1995 | He |
| 5,562,027 A | 10/1996 | Moore |
| 5,563,809 A | 10/1996 | Williams et al. |
| 5,592,875 A | 1/1997 | Moschel |
| 5,699,729 A | 12/1997 | Moschel |
| 5,725,737 A | 3/1998 | Pikulik et al. |
| 5,743,177 A | 4/1998 | Wostbrock |
| 5,745,365 A | 4/1998 | Parker |
| 5,960,374 A | 9/1999 | Lausier |
| 6,152,720 A | 11/2000 | Greb et al. |
| 6,336,078 B1 | 1/2002 | Sakayori et al. |
| 6,356,846 B1 | 3/2002 | Habeger, Jr. et al. |
| 6,370,961 B1 | 4/2002 | Trantzas et al. |
| 6,411,860 B1 | 6/2002 | Chen |
| 6,482,339 B1 | 11/2002 | Greb et al. |
| 6,519,552 B1 | 2/2003 | Sampath et al. |
| 6,567,720 B1 | 5/2003 | Figiel |
| 6,568,285 B1 | 5/2003 | Moore et al. |
| 6,769,314 B2 | 8/2004 | Moore |
| 6,805,899 B2 | 10/2004 | MacHattie et al. |
| 6,849,851 B2 | 2/2005 | Komulainen et al. |
| 6,925,279 B2 | 8/2005 | Kamoshita |
| 6,934,028 B2 | 8/2005 | Ho et al. |
| 6,950,777 B1 | 9/2005 | Lilburn et al. |
| 7,018,708 B2 | 3/2006 | Song et al. |
| 7,127,315 B2 | 10/2006 | Junge et al. |
| 7,155,356 B2 | 12/2006 | Mantyla et al. |
| 7,185,537 B2 | 3/2007 | Muhs |
| 7,225,688 B2 | 6/2007 | Moore et al. |
| 7,261,680 B2 | 8/2007 | Lutz |
| 7,294,234 B2 | 11/2007 | Munch et al. |
| 7,305,894 B2 | 12/2007 | Moore et al. |
| 7,392,715 B2 | 7/2008 | Moore et al. |
| 7,406,876 B2 | 8/2008 | Krozer |
| 7,444,862 B2 | 11/2008 | Innala et al. |
| 7,581,456 B2 | 9/2009 | Moore et al. |
| 7,582,188 B2 | 9/2009 | Stoffel et al. |
| 7,608,166 B2 | 10/2009 | Huang et al. |
| 7,608,338 B2 | 10/2009 | Song et al. |
| 7,629,799 B2 | 12/2009 | Murphy |
| 7,736,466 B2 | 6/2010 | Singh et al. |
| 7,745,525 B2 | 6/2010 | Koenig |
| 7,815,770 B2 | 10/2010 | Huang et al. |
| 7,828,935 B2 | 11/2010 | Huang et al. |
| 7,963,180 B2 | 6/2011 | Moore et al. |
| 7,967,953 B2 | 6/2011 | Singh et al. |
| 8,007,920 B2 | 8/2011 | Song et al. |
| 8,012,551 B2 | 9/2011 | Song et al. |
| 8,123,907 B2 | 2/2012 | Stoffel et al. |
| 8,236,141 B2 | 8/2012 | Pak |
| 8,292,295 B2 | 10/2012 | Ohshima et al. |
| 8,361,573 B2 | 1/2013 | Koenig |
| 8,372,243 B2 | 2/2013 | Singh et al. |
| 8,382,946 B2 | 2/2013 | Song et al. |
| 8,440,053 B2 | 5/2013 | Koenig et al. |
| 8,474,333 B2 | 7/2013 | Berendes |
| 8,475,347 B2 | 7/2013 | Gustafson et al. |
| 8,486,229 B2 | 7/2013 | Pietikainen et al. |
| 8,540,241 B2 | 9/2013 | Sugahara |
| 8,574,690 B2 | 11/2013 | Koenig et al. |
| 8,586,156 B2 | 11/2013 | Koenig et al. |
| 8,586,279 B2 | 11/2013 | Williams et al. |
| 8,586,280 B2 | 11/2013 | Williams et al. |
| 8,608,908 B2 | 12/2013 | Koenig et al. |
| 8,652,593 B2 | 2/2014 | Koenig |
| 8,652,594 B2 | 2/2014 | Koenig et al. |
| 8,697,203 B2 | 4/2014 | Koenig |
| 8,758,565 B2 | 6/2014 | Singh et al. |
| 8,758,886 B2 | 6/2014 | Koenig et al. |
| 8,795,796 B2 | 8/2014 | Koenig |
| 9,121,686 B2 | 9/2015 | Gustafson |
| 2004/0237665 A1 | 12/2004 | Mucke et al. |
| 2005/0208878 A1 | 9/2005 | Weiss |
| 2005/0261115 A1* | 11/2005 | Moore ............... D21F 3/06 492/10 |
| 2006/0248723 A1 | 11/2006 | Gustafson |
| 2007/0006644 A1 | 1/2007 | Schultheis |
| 2008/0087073 A1 | 4/2008 | Ulfert et al. |
| 2009/0320612 A1* | 12/2009 | Moore ............... G01L 5/0085 73/862.55 |
| 2010/0125428 A1 | 5/2010 | Moore |
| 2012/0310596 A1 | 12/2012 | Gustafson et al. |
| 2013/0185015 A1 | 7/2013 | Cantrell |
| 2014/0257719 A1 | 9/2014 | Figiel |
| 2014/0352882 A1 | 12/2014 | Nash et al. |
| 2015/0316429 A1 | 11/2015 | Figiel |
| 2015/0316430 A1 | 11/2015 | Figiel |
| 2015/0316432 A1 | 11/2015 | Figiel |
| 2016/0038969 A1 | 2/2016 | Schmitt |

FOREIGN PATENT DOCUMENTS

| | | |
|---|---|---|
| CN | 101395456 A | 3/2009 |
| CN | 102345242 A | 2/2012 |
| EP | 1653207 | 5/2006 |
| EP | 2641857 | 12/2015 |
| WO | 9113337 | 9/1991 |
| WO | 9625288 | 8/1996 |
| WO | 2005113891 | 12/2005 |
| WO | WO-2008/155461 | 12/2008 |
| WO | WO-2009/092761 | 7/2009 |
| WO | 2011107660 | 9/2011 |
| WO | WO-2012/166835 A1 | 12/2012 |

\* cited by examiner

| Sensor Reading /402 | Pressure Reading /404 | Circumferential Segment Number /406 |
|---:|---:|---:|
| 1 | 0 | 1 |
| 2 | 2.253860455 | 2 |
| 3 | 4.32512654 | 3 |
| 4 | 6.045996595 | 4 |
| 5 | 7.277055963 | 5 |
| 6 | 7.918571535 | 6 |
| 7 | 7.918571535 | 7 |
| 8 | 7.277055963 | 8 |
| 9 | 6.045996595 | 9 |
| 10 | 4.32512654 | 10 |
| 11 | 2.253860455 | 11 |
| 12 | 4.53283E-15 | 12 |
| 13 | -1.753860455 | 13 |
| 14 | -4.32512654 | 14 |
| 15 | -6.045996595 | 15 |
| 16 | -7.277055963 | 16 |
| 17 | -7.918571535 | 17 |
| 18 | -7.918571535 | 18 |
| 19 | -6.277055963 | 19 |
| 20 | -6.045996595 | 20 |
| 21 | -4.32512654 | 21 |
| 22 | -2.253860455 | 22 |
| 23 | -9.06566E-15 | 1 |
| 24 | 2.253860455 | 2 |
| 25 | 6.32512654 | 3 |
| 26 | 6.045996595 | 4 |
| 27 | 11.27705596 | 5 |
| 28 | 7.918571535 | 6 |
| 29 | 7.918571535 | 7 |
| 30 | 7.277055963 | 8 |
| 31 | 6.045996595 | 9 |
| 32 | 4.32512654 | 10 |
| 33 | 2.253860455 | 11 |
 continued to FIG. 4B
 continued to FIG. 4B
FIG. 4A continued from FIG. 4A ①

| | |
|---|---|
| 34 | 2.94036E-15 |
| 35 | -2.253860455 |
| 36 | -4.32512654 |
| 37 | -6.45996595 |
| 38 | -7.277055963 |
| 39 | -7.918571535 |
| 40 | -7.918571535 |
| 41 | -7.277055963 |
| 42 | -6.045996595 |
| 43 | -4.32512654 |
| 44 | -2.253860455 |
| 45 | -1.81313E-14 |
| 46 | 2.253860455 |
| 47 | 4.32512654 |
| 48 | 6.045996595 |
| 49 | 7.277055963 |
| 50 | 7.918571535 |
| 51 | 7.918571535 | continued from FIG. 4A ①

| |
|---|
| 12 |
| 13 |
| 14 |
| 15 |
| 16 |
| 17 |
| 18 |
| 19 |
| 20 |
| 21 |
| 22 |
| 1 |
| 2 |
| 3 |
| 4 |
| 5 |
| 6 |
| 7 |

FIG. 4B

| CIRCUMFERENTIAL SEGMENT | AXIAL SENSOR NUMBER | | | | | |
|---|---|---|---|---|---|---|
| | 1 | 2 | 3 | 4 | ... | 14 |
| 1 | | | | | | |
| 2 | | | | | | |
| 3 | | | | | | |
| 4 | | | | | | |
| ... | | | | | | |
| 22 | | | | | | |

SUM OF PRESSURE READINGS MATRIX

FIG. 7

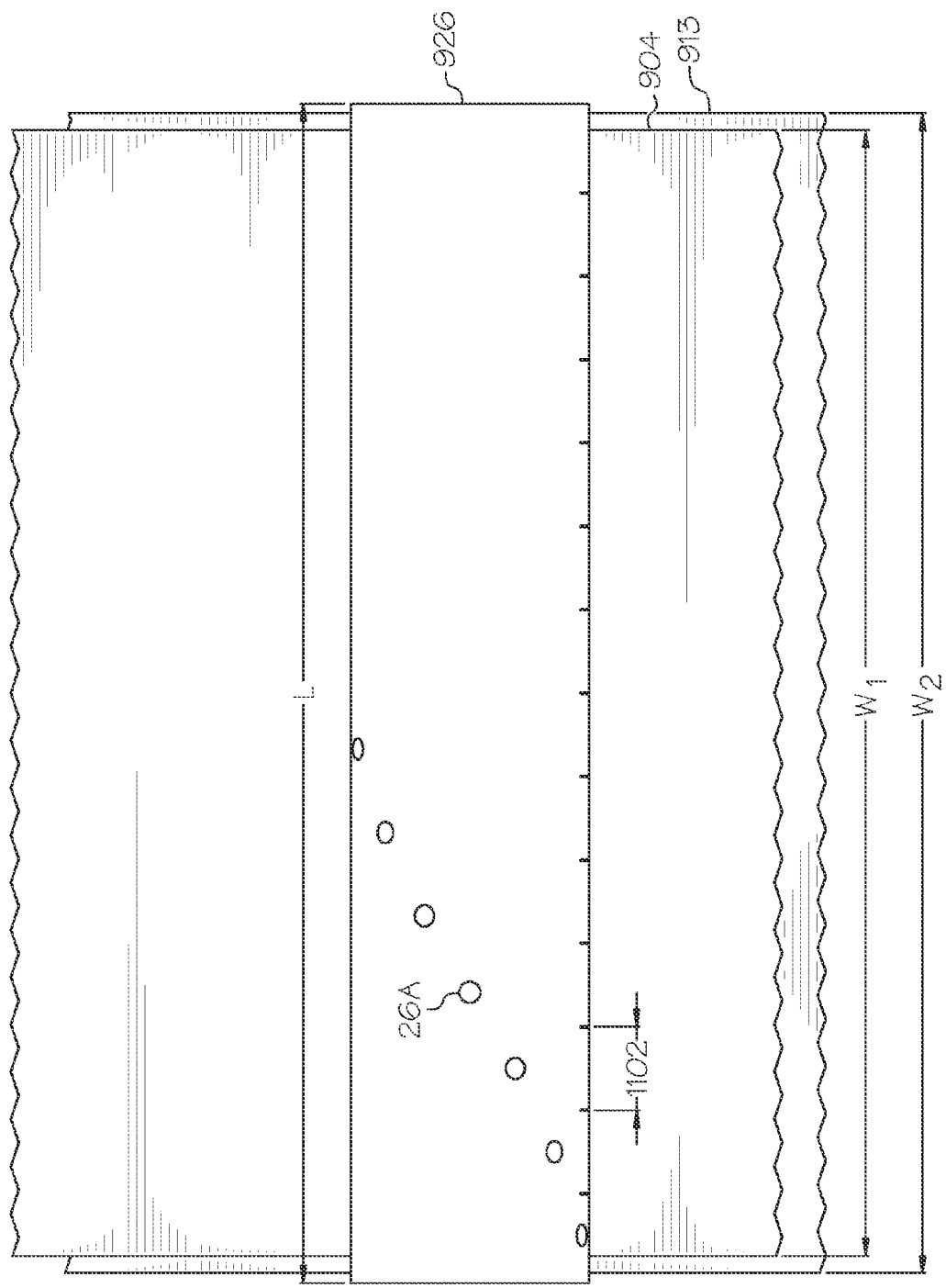

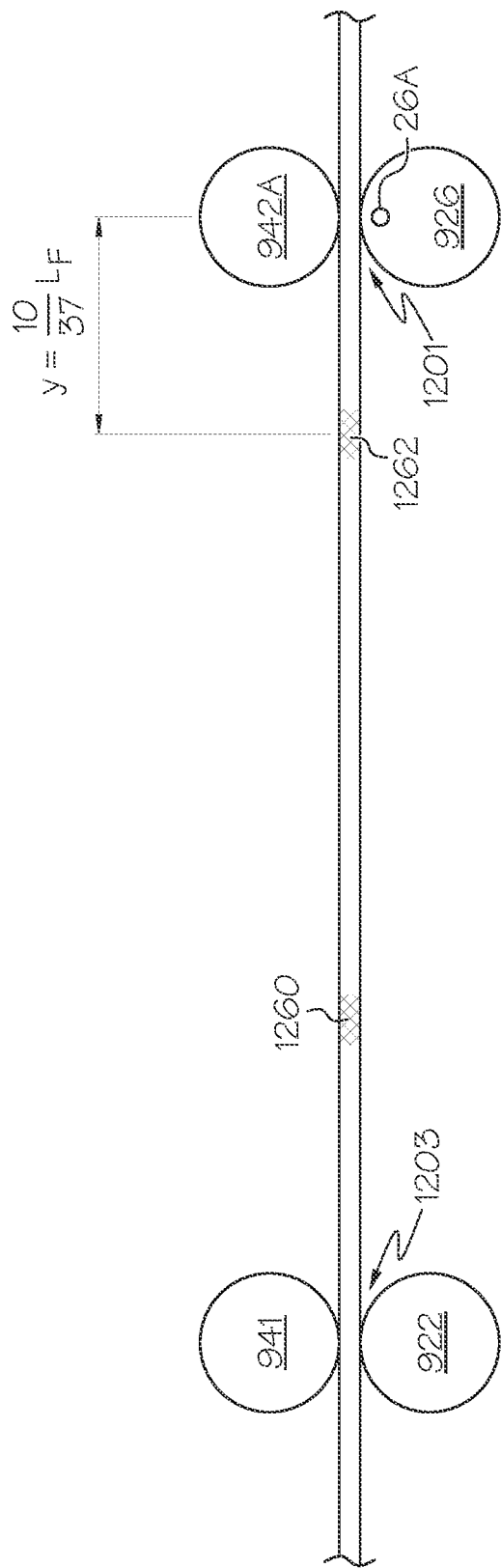

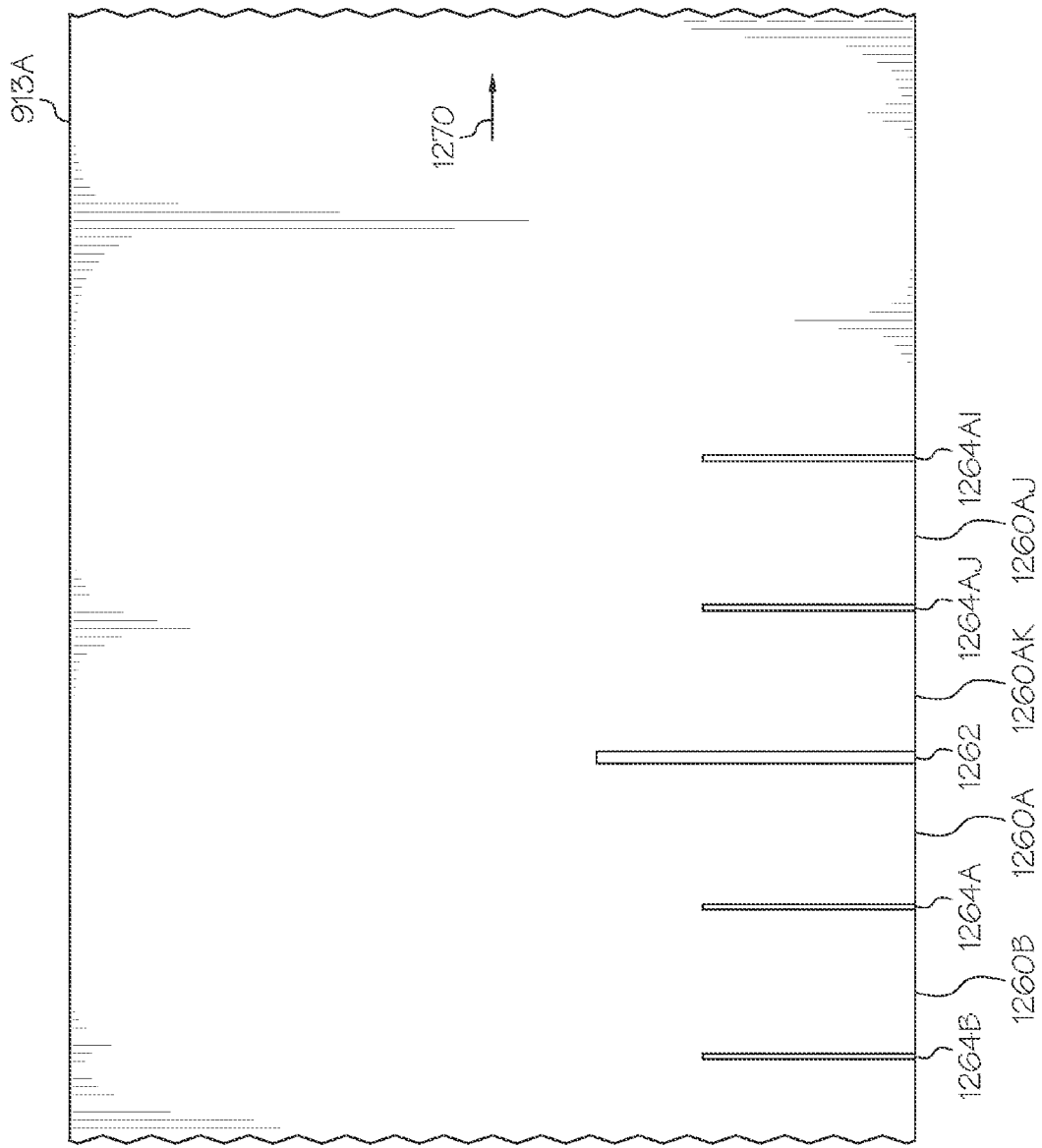

| Sensor Reading (402A) | Discrete Nip Pressure Reading (404A) | Mating Roll Tracking Segment (406A) | Felt 913 Tracking Segment (1402) | Felt 911 Tracking Segment (1404) |
|---|---|---|---|---|
| 1 | 0 | 1 | 1 | 1 |
| 2 | 2.253860455 | 2 | 2 | 2 |
| 3 | 4.32512654 | 3 | 3 | 3 |
| 4 | 6.045996595 | 4 | 4 | 4 |
| 5 | 7.277055963 | 5 | 5 | 5 |
| 6 | 7.918571535 | 6 | 6 | 6 |
| 7 | 7.918571535 | 7 | 7 | 7 |
| 8 | 7.277055963 | 8 | 8 | 8 |
| 9 | 6.045996595 | 9 | 9 | 9 |
| 10 | 4.32512654 | 10 | 10 | 10 |
| 11 | 2.253860455 | 11 | 11 | 11 |
| 12 | 4.53283E-15 | 12 | 12 | 12 |
| 13 | -1.753860455 | 13 | 13 | 13 |
| 14 | -4.32512654 | 14 | 14 | 14 |
| 15 | -6.045996595 | 15 | 15 | 15 |
| 16 | -7.277055963 | 16 | 16 | 16 |
| 17 | -7.918571535 | 17 | 17 | 17 |
| 18 | -7.918571535 | 18 | 18 | 18 |
| 19 | -6.277055963 | 19 | 19 | 19 |
| 20 | -6.045996595 | 20 | 20 | 20 |
| 21 | -4.32512654 | 21 | 21 | 21 |
| 22 | -2.253860455 | 22 | 22 | 22 |
| 23 | -9.06566E-15 | 1 | 23 | 23 |
| 24 | 2.253860455 | 2 | 24 | 24 |
| 25 | 6.32512654 | 3 | 25 | 25 |
| 26 | 6.045996595 | 4 | 26 | 26 |
| 27 | 11.27705596 | 5 | 27 | 27 |
| 28 | 7.918571535 | 6 | 28 | 28 |
| 29 | 7.918571535 | 7 | 29 | 29 |
| 30 | 7.277055963 | 8 | 30 | 30 |
| 31 | 6.045996595 | 9 | 31 | 31 |
| 32 | 4.32512654 | 10 | 1 | 32 |
| 33 | 2.253860455 | 11 | 2 | 33 |

(2) continued to FIG. 14B

FIG. 14A (2) continued to FIG. 14B continued from FIG. 14A (2)

continued from FIG. 14A (2)

| | | | | |
|---|---|---|---|---|
| 34 | 2.94036E-15 | 12 | 3 | 34 |
| 35 | -2.253860455 | 13 | 4 | 35 |
| 36 | -4.32512654 | 14 | 5 | 36 |
| 37 | -6.45996595 | 15 | 6 | 37 |
| 38 | -7.277055963 | 16 | 7 | 1 |
| 39 | -7.918571535 | 17 | 8 | 2 |
| 40 | -7.918571535 | 18 | 9 | 3 |
| 41 | -7.277055963 | 19 | 10 | 4 |
| 42 | -6.045996595 | 20 | 11 | 5 |
| 43 | -4.32512654 | 21 | 12 | 6 |
| 44 | -2.253860455 | 22 | 13 | 7 |
| 45 | -1.81313E-14 | 1 | 14 | 8 |
| 46 | 2.253860455 | 2 | 15 | 9 |
| 47 | 4.32512654 | 3 | 16 | 10 |
| 48 | 6.045996595 | 4 | 17 | 11 |
| 49 | 7.277055963 | 5 | 18 | 12 |
| 50 | 7.918571535 | 6 | 19 | 13 |
| 51 | 7.918571535 | 7 | 20 | 14 |
| 52 | 7.277055936 | 8 | 21 | 15 |
| 53 | 6.045996595 | 9 | 22 | 16 |
| 54 | 4.32515654 | 10 | 23 | 17 |
| 55 | 2.25386455 | 11 | 24 | 18 |
| 56 | 0.5 | 12 | 25 | 19 |
| 57 | -2.253860455 | 13 | 26 | 20 |
| 58 | -0.32512654 | 14 | 27 | 21 |
| 59 | -6.045996595 | 15 | 28 | 22 |
| 60 | -6.277055963 | 16 | 29 | 23 |
| 61 | -7.918571535 | 17 | 30 | 24 |
| 62 | -5.918571535 | 18 | 31 | 25 |
| 63 | -7.277055963 | 19 | 1 | 26 |
| 64 | -6.045996595 | 20 | 2 | 27 |
| 65 | -4.32512654 | 21 | 3 | 28 |
| 66 | -2.253860455 | 22 | 4 | 29 |
| 67 | 4.32512654 | 1 | 5 | 30 |
| 68 | 6.045996595 | 2 | 6 | 31 |

FIG. 14B continued from FIG. 14B
(3)

continued from FIG. 14B
(3)

| | | | | |
|---|---|---|---|---|
| 69 | 4.32512654 | 3 | 7 | 32 |
| 70 | 6.045996595 | 4 | 8 | 33 |
| 71 | 7.277055963 | 5 | 9 | 34 |
| 72 | 7.918571535 | 6 | 10 | 35 |
| 73 | 7.918571535 | 7 | 11 | 36 |
| 74 | 7.277055963 | 8 | 12 | 37 |
| 75 | 6.045996595 | 9 | 13 | 1 |
| 76 | 4.32512654 | 10 | 14 | 2 |
| 77 | 2.253860455 | 11 | 15 | 3 |
| 78 | 6.86083E-15 | 12 | 16 | 4 |
| 79 | -2.253860455 | 13 | 17 | 5 |
| 80 | -4.32512654 | 14 | 18 | 6 |
| 81 | -6.045996595 | 15 | 19 | 7 |
| 82 | -7.277055963 | 16 | 20 | 8 |
| 83 | -7.918571535 | 17 | 21 | 9 |
| 84 | -7.918571535 | 18 | 22 | 10 |
| 85 | -7.277055963 | 19 | 23 | 11 |
| 86 | -6.045996595 | 20 | 24 | 12 |

FIG. 14C

| Circumferential Segment | Axial Sensor Number | 1 | 2 | 3 | 4 | ... | 14 |
|---|---|---|---|---|---|---|---|
| 1 | | -0.05024 | | | | | |
| 2 | | -0.05024 | | | | | |
| 3 | | -0.04534 | | | | | |
| 4 | | -0.01792 | | | | | |
| 5 | | 0.011778 | | | | | |
| 6 | | 0.047523 | | | | | |
| 7 | | 0.08642 | | | | | |
| 8 | | 0.119143 | | | | | |
| 9 | | 0.161062 | | | | | |
| 10 | | 0.19076 | | | | | |
| 11 | | 0.236697 | | | | | |
| 12 | | 0.247768 | | | | | |
| 13 | | 0.223076 | | | | | |
| 14 | | 0.212005 | | | | | |
| 15 | | 0.19076 | | | | | |
| 16 | | 0.161062 | | | | | |
| 17 | | 0.125316 | | | | | |
| 18 | | 0.08642 | | | | | |
| 19 | | 0.047523 | | | | | |
| 20 | | 0.011778 | | | | | |
| 21 | | -0.01792 | | | | | |
| 22 | | -0.04534 | | | | | |
| 23 | | -0.02555 | | | | | |
| 24 | | -0.02555 | | | | | |
| 25 | | -0.01447 | | | | | |
| 26 | | -0.01792 | | | | | |
| 27 | | 4.005605 | | | | | |
| 28 | | 0.047523 | | | | | |
| 29 | | 0.08642 | | | | | |
| 30 | | 0.125316 | | | | | |
| 31 | | 0.161062 | | | | | |

AVERAGE PRESSURE MATRIX

FIG. 15B

| TIME-BASED SEGMENT (1522) | AXIAL SENSOR NUMBER | 1 (1526A) | 2 | 3 | 4 | ... | 14 |
|---|---|---|---|---|---|---|---|
| 1 | | 0.243323 | | | | | |
| 2 | | 0.258515 | | | | | |
| 3 | | 0.295279 | | | | | |
| 4 | | 0.235971 | | | | | |
| 5 | | 0.213576 | | | | | |
| 6 | | 0.214609 | | | | | |
| 7 | | 0.189303 | | | | | |
| 8 | | 0.154412 | | | | | |
| 9 | | 0.134227 | | | | | |
| 10 | | 0.160391 | | | | | |
| 11 | | 0.073188 | | | | | |
| 12 | | 0.050794 | | | | | |
| 13 | | 0.050309 | | | | | |
| 14 | | 0.065015 | | | | | |
| 15 | | 0.124324 | | | | | |
| 16 | | 0.087894 | | | | | |
| 17 | | 0.101567 | | | | | |
| 18 | | 0.134227 | | | | | |
| 19 | | 0.161765 | | | | | |
| 20 | | 0.167244 | | | | | |
| 21 | | 0.199904 | | | | | |
| 22 | | 0.287106 | | | | | |
| 23 | | 0.250676 | | | | | |
| 24 | | 0.253362 | | | | | |
| 25 | 1528 | 2.258515 | | | | | |
| 26 | | 0.250676 | | | | | |
| 27 | | 0.287106 | | | | | |
| 28 | | 0.199904 | | | | | |
| 29 | | 0.226067 | | | | | |
| 30 | | 0.147059 | | | | | |
| 31 | | 0.134227 | | | | | |
| 32 | | 0.101567 | | | | | |
| 33 | | 0.087894 | | | | | |
| 34 | | 0.124324 | | | | | |
| 35 | | 0.065015 | | | | | |
| 36 | | 0.042956 | | | | | |
| 37 | | 0.058147 | | | | | |
| AVERAGE | PRESSURE MATRIX | | | | | | |

FIG. 15C

MONITORING UPSTREAM MACHINE WIRES AND FELTS

RELATED APPLICATIONS

The present application is related to U.S. patent application Ser. No. 14/735,947 filed Jun. 10, 2015 entitled MONITORING MACHINE WIRES AND FELTS, U.S. patent application Ser. No. 14/735,892 filed Jun. 10, 2015 entitled COUNT-BASED MONITORING MACHINE WIRES AND FELTS, U.S. patent application Ser. No. 14/735,716 filed Jun. 10, 2015 entitled MONITORING APPLICATOR RODS, U.S. patent application Ser. No. 14/736,060 filed Jun. 10, 2015 entitled MONITORING APPLICATOR RODS AND APPLICATOR ROD NIPS, and U.S. patent application Ser. No. 14/736,010 filed Jun. 10, 2015 entitled MONITORING OSCILLATING COMPONENTS, the disclosures of which are incorporated by reference herein in their entirety.

FIELD

The present invention relates generally to papermaking and, more particularly to monitoring one or more components in the papermaking process.

BACKGROUND

Nipped rolls are used in a vast number of continuous process industries including, for example, papermaking, steel making, plastics calendaring and printing. In the process of papermaking, many stages are required to transform headbox stock into paper. The initial stage is the deposition of the headbox stock, commonly referred to as "white water," onto a paper machine forming fabric, commonly referred to as a "wire." Upon deposition, a portion of the white water flows through the interstices of the forming fabric wire leaving a mixture of liquid and fiber thereon. This mixture, referred to in the industry as a "web," can be treated by equipment which further reduce the amount of moisture content of the finished product. The fabric wire continuously supports the fibrous web and transfers it to another fabric called a felt which advances it through the various dewatering equipment that effectively removes the desired amount of liquid from the web. Water from the web is pressed into the wet felt and then can be removed as the wet felt passes a suction box. Dry felts can also be used to support the fibrous web through steam dryers.

One of the stages of dewatering is effected by passing the web through a pair or more of rotating rolls which form a nip press or series thereof, during which liquid is expelled from the web via the pressure being applied by the rotating rolls. The rolls, in exerting force on the web and felt, will cause some liquid to be pressed from the fibrous web into the felt. The web can then be advanced to other presses or drying equipment which further reduce the amount of moisture in the web. The "nip region" is the contact region between two adjacent rolls through which the paper web passes.

The condition of the various wires and felts can cause variations in the amount of liquid and other materials that are removed from the web which can, in turn, alter an amount of nip pressure applied to the web in a nip region. Other components in the papermaking process such as size application stations, coating stations, doctor blades, and oscillating showers can also affect the characteristics of the web. Even nip pressure axially along the roll and stable in time is beneficial in papermaking and contributes to moisture content, caliper, sheet strength and surface appearance. For example, a lack of uniformity in the nip pressure can often result in paper of poor quality. Thus, there remains a need to monitor various components of the papermaking process and account for their potential effect on nip pressure at one or more nip regions.

SUMMARY

One aspect of the present invention relates to a system associated with a sensing roll and a mating roll for collecting roll data. The sensing roll and mating roll are located relative to one another to create a nip therebetween, wherein a web of material travels through the nip from an upstream direction to a downstream direction and a continuous band, arranged to travel around in a loop pattern, contacts at least a region of the web of material upstream from the nip. A plurality of sensors are located at axially spaced-apart locations of the sensing roll, wherein each sensor enters a region of the nip during each rotation of the sensing roll to generate a respective sensor signal. The system also includes structure for generating a periodically occurring time reference associated with each rotation of the continuous band around the loop pattern; and a processor to receive the periodically occurring time reference and the respective sensor signal generated by each sensor. The processor upon receiving the respective sensor signal operates to: a) determine a particular one of the plurality of sensors which generated the respective sensor signal, b) based upon an amount of time that elapsed between when the respective sensor signal was generated and a most recent time reference, identify one of a plurality of time-based tracking segments associated with the continuous band, wherein each of the plurality of tracking segments is, respectively, associated with a different amount of elapsed time, and c) store the respective sensor signal to associate the respective sensor signal with the identified one time-based tracking segment.

In accordance with related aspects of the invention each of the respective sensor signals comprises a pressure value. In accordance with other aspects of the invention the continuous band comprises a press felt or a wire mesh. Also, in accordance with at least some aspects, the continuous band does not travel through the nip. Additionally, the structure for generating a periodically occurring time reference includes a signal generator to generate a trigger signal on each rotation of the continuous band as the reference location on the continuous band travels past a predetermined position.

In a related aspect of the present invention the processor receives the respective sensor signal for each of the plurality of sensors during each rotation of the sensing roll, and a plurality of the respective sensor signals occur during a plurality of rotations of the sensing roll. For each one of the plurality of the respective sensor signals, the processor identifies an associated continuous band axial segment and its identified one time-based tracking segment.

In yet another related aspect, the continuous band comprises n axial segments, having respective index values: 1, 2, . . . , n; the continuous band rotational period comprises m time-based tracking segments, each having a respective, unique index value x in the range of: 1, 2, . . . , m, such that there are (n times m) unique permutations that are identifiable by a two-element set comprising a respective axial segment index value and a respective time-based tracking segment index value. A respective average pressure value can be associated with each of the (n times m) unique permutations, each of the respective average pressure values based on previously collected pressure readings related to the nip.

In another related aspect, each circumferential tracking segment of the continuous band contacts the web of material at an upstream location from the region of the nip; and the index value q of each circumferential tracking segment is calculated based on a) a distance between the region of the nip and the upstream location and b) the index value x of the corresponding time-based tracking segment. Furthermore, the index value x of a particular time-based tracking segment is calculated independently from calculating the index value q of the corresponding circumferential tracking segment.

In yet another related aspect of the invention, each circumferential tracking segment of the continuous band contacts the web of material at an upstream location from the region of the nip; one particular circumferential tracking segment contacts the web of material at the upstream location substantially concurrently with the signal generator generating the trigger signal, and the index value q of each circumferential tracking segment is calculated based on a) a distance between the region of the nip and the upstream location, b) the index value of the one particular circumferential tracking segment, and c) the index value x of the corresponding time-based tracking segment.

Another aspect of the present invention relates to a method associated with a sensing roll and a mating roll for collecting roll data that includes generating a respective sensor signal from each of a plurality of sensors located at axially spaced-apart locations of the sensing roll, wherein each respective sensor signal is generated when each sensor enters a region of a nip between the sensing roll and the mating roll during each rotation of the sensing roll; the sensing roll and mating roll located relative to one another to create the nip therebetween, wherein a web of material travels through the nip from an upstream direction to a downstream direction and a continuous band, arranged to travel around in a loop pattern, contacts at least a region of the web of material upstream from the nip. The method also includes generating a periodically occurring time reference associated with each rotation of the continuous band around the loop pattern and receiving the respective sensor signal generated by each sensor. Then, upon receiving the respective sensor signal, a) determining a particular one of the plurality of sensors which generated the respective sensor signal, b) based upon an amount of time that elapsed between when the respective sensor signal was generated and a most recent time reference, identifying one of a plurality of time-based tracking segments associated with the continuous band, wherein each of the plurality of time-based tracking segments is, respectively, associated with a different amount of elapsed time, and c) storing the respective sensor signal to associate the respective sensor signal with the identified one time-based tracking segment.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements.

FIGS. 4A and 4B illustrate a table of how collecting x sensor readings from a sensor would be associated with the different circumferential segments of the mating roll, in accordance with the principles of the present invention.

FIGS. 6, 7, and 8 depict matrices of different values that can be calculated for various axial segments and circumferential segments of a mating roll in accordance with the principles of the present invention.

FIG. 11 illustrates a flat portion of a felt loop in relation to a sensing roll in accordance with the principles of the present invention.

FIGS. 12A-C illustrate a wet felt station with a pressing region having a sensing roll that is downstream from a wet felt station that does not have a press region with a sensing roll in accordance with the principles of the present invention.

FIGS. 12D, 12E and 12F illustrate detailed views of an alternative wet felt station in accordance with the principles of the present invention.

FIGS. 14A-14C illustrate a table of how collecting sensor readings from a sensor would be associated with the different tracking segments of a felt in accordance with the principles of the present invention.

FIGS. 15A-15C illustrate tables of how collecting sensor readings from a sensor would be associated with the different tracking segments of a different felt in accordance with the principles of the present invention.

DETAILED DESCRIPTION

The present application is related to each of the following: U.S. patent application Ser. No. 14/268,672 entitled METHOD AND SYSTEM ASSOCIATED WITH A SENSING ROLL AND A MATING ROLL FOR COLLECTING ROLL DATA, filed May 2, 2014; U.S. patent application Ser. No. 14/268,706 entitled METHOD AND SYSTEM ASSOCIATED WITH A SENSING ROLL AND A MATING ROLL FOR COLLECTING DATA INCLUDING FIRST AND SECOND SENSOR ARRAYS, filed May 2, 2014; and U.S. patent application Ser. No. 14/268,737 entitled METHOD AND SYSTEM ASSOCIATED WITH A SENSING ROLL INCLUDING PLURALITIES OF SENSORS AND A MATING ROLL FOR COLLECTING ROLL DATA, filed May 2, 2014, the disclosures of which are incorporated by reference herein in their entirety.

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
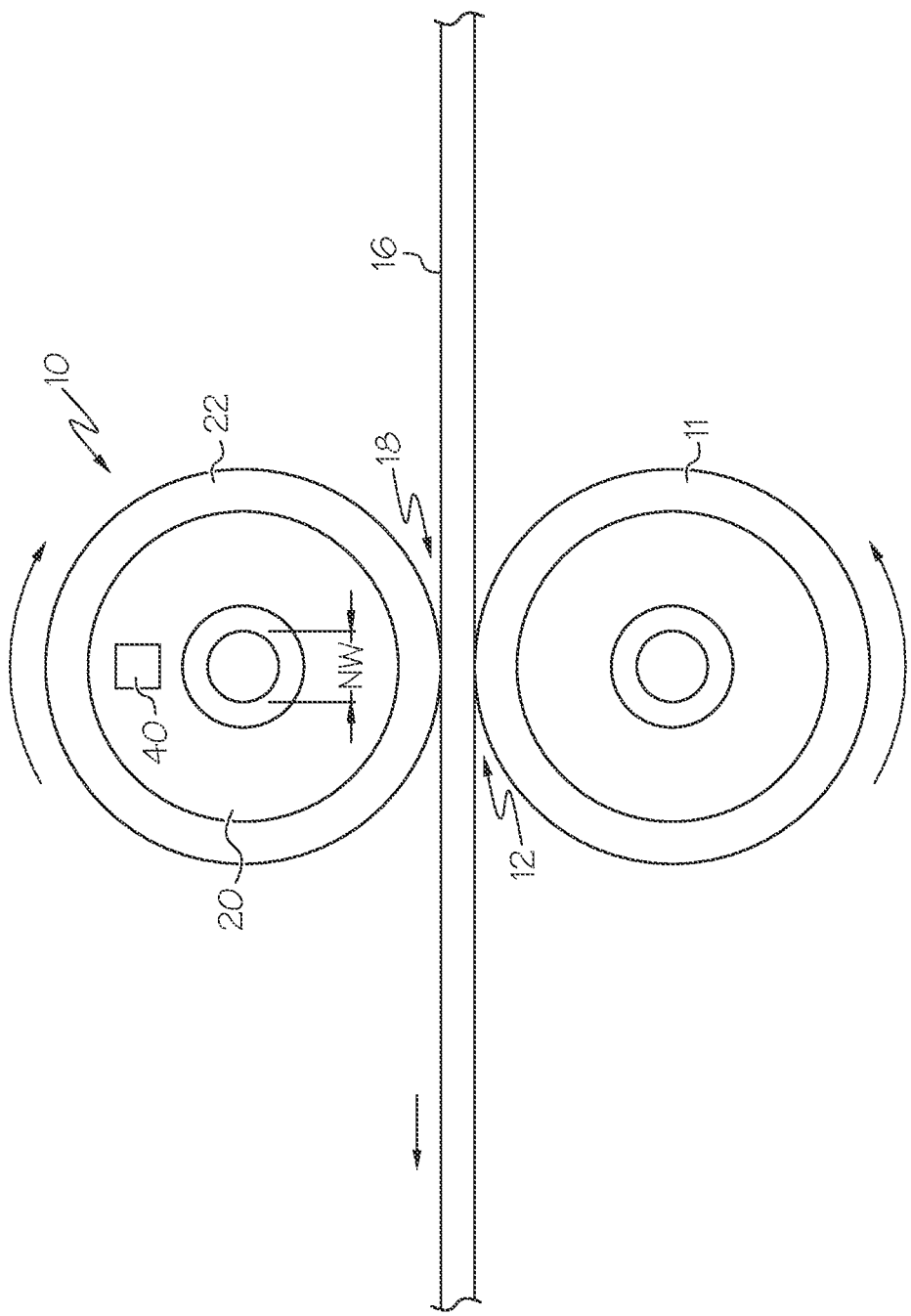
FIG. 1 is an end, schematic view of a nip press, in accordance with the principles of the present invention, showing the formation of a web nipped between the nip rolls, the nip width of the nip press being designated by the letters "NW."
Figure 2:
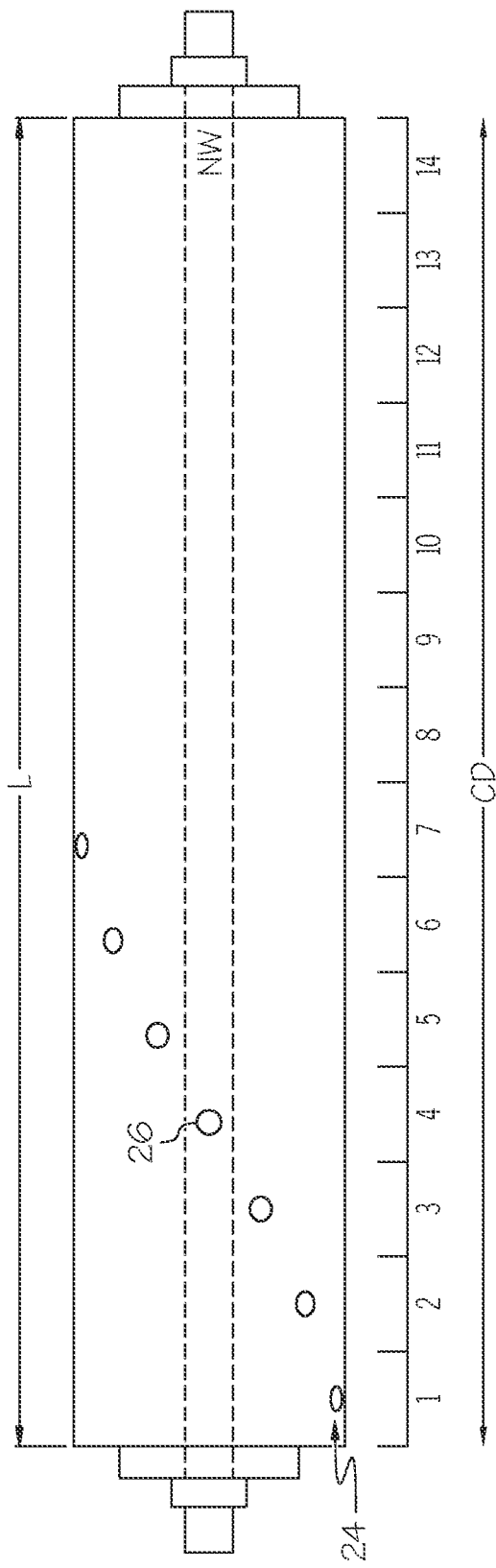
FIG. 2 is a side elevation view of a sensing roll showing the placement of a line of sensors in accordance with the principles of the present invention.

As illustrated in FIG. 1, a sensing roll 10 and a mating roll 11 define a nip 12 receiving a fibrous web 16, such as a paper web, to apply pressure to the web 16. It is contemplated that, in some cases, a continuous band felt may support the web such that the felt and the web enter the nip 12. The sensing roll 10 comprises an inner base roll 20 and an outer roll cover 22. As shown in FIG. 2, a set 24 of sensors 26 is disposed at least partially in the roll cover 22. The set 24 of sensors 26 may be disposed along a line that spirals around the entire length of the roll 10 in a single revolution to define a helical pattern, which is a common sensor geometry arrangement for roll covers. However, the helical pattern is merely an example and any arrangement is contemplated in which at least one sensor is placed at each axial position, anywhere along the circumference, at which data is to be collected. Each sensor 26 can, for example, measure the pressure that is being exerted on the sensor when it enters a region of the nip 12 between the rolls 10 and 11. In particular, the set 24 of sensors 26 may be positioned in the sensing roll 10, for example, at different axial locations or segments along the sensing roll 10, wherein the axial segments are preferably equally sized. In the illustrated embodiment, there are fourteen axial segments, labelled 1-14 in FIG. 2, each having one sensor 26 located therein. It is also contemplated that the set 24 of sensors 26 may be linearly arranged so as to define a line of sensors, i.e., all sensors reside at the same circumferential location. One of ordinary skill will readily recognize that more than fourteen, or less than fourteen, axial segments may be provided as well along with a corresponding equal number of axially-spaced sensors located on the sensing roll. Also, in the description below, each sensor 26 may be referred to as a pressure sensor, for example, but other types of sensors are also contemplated such as, for example, temperature sensors.

Because having even nip pressure is beneficial during paper manufacturing, correctly calculating and displaying the nip pressure profile are also beneficial since any corrections or adjustments to be made to the rotating rolls based on an inaccurate calculated nip pressure profile could certainly exacerbate any operational problems. There are three primary measurements of variability. The nip pressure profile has variability that can be termed cross-directional variability as it is the variability of average pressure per cross-direction position across the nip. Another type of variability represents the variability of the high speed measurements at each position in the single line of sensors. This variability represents the variability of other equipment in the paper making process such as, for example, wires and felts and also including the rotational variability of the mating roll, i.e., the roll nipped to the sensing roll. The third variability in the nip profile includes the variability of multiple sensors, discussed below, at each cross-directional position of the roll. This variability represents the "rotational variability" of the sensing roll as it rotates through its plurality of sensing positions and can only be seen by having a plurality of sensors in the same position.

One benefit of embedding a single set of sensors in covered rolls is to measure the real-time pressure profile and adjust loading pressures and roll crowns or roll curvature (using, for example, internal hydraulic cylinders) to achieve a flat pressure profile. As an alternative to a single set of sensors, two pluralities or arrays of sensors can be included on a sensing roll as described more fully in the earlier referenced U.S. patent application Ser. No. 14/268,672 which is incorporated herein by reference in its entirety. The sensing roll can, for example, be separated into 14 axial segments. First and second pluralities of sensors, respectfully, are disposed at least partially in the roll cover. Each of the first plurality of sensors is located in one of the 14 axial segments of the sensing roll. Likewise, each of the second plurality of sensors is located in one of the 14 axial segments of the sensing roll. Each sensor of the first plurality has a corresponding sensor from the second plurality located in a same axial segment of the sensing roll. The first plurality of sensors can be disposed along a line that spirals around the entire length of the roll in a single revolution to define a helical pattern. In a similar manner, the second plurality of sensors can be disposed along a line that spirals around the entire length of the roll in a single revolution to define a helical pattern. The first and second pluralities of sensors can be separated from one another by 180 degrees. Each sensor measures the pressure that is being exerted on the sensor when it enters a region of a nip. It is contemplated that the first and second pluralities of sensors may be linearly arranged so as to define first and second lines of sensors, which are spaced approximately 180 degrees apart. Various alternative configurations of a plurality of sensors are also contemplated. For example, a plurality of sensors could be helically arranged in a line that spirals, in two revolutions, around the entire length of roll.

Typically, the sensing roll 10 and the mating roll 11 are sized differently, i.e., they have a different size radially and circumferentially. Each roll may have variations in its size circumferentially across the axial dimension. Further, as the roll rotates, the distance from the central axis (radial dimension) to the outer surface may vary for each axial position at the same angle of rotation even were the circumferential dimensions to be the same for each axial position.

For example, rolls are periodically ground which results is small arbitrary changes in diameter from the manufacture's specification. There may also be slippage with one or more of the rolls resulting in the sensing roll surface traveling at a speed that is different than the mating roll surface. Consequently, it is rare that two rolls would have exactly the same period of rotation or have periods that are exact harmonics.

Thus, as the sensing roll 10 and mating roll 11 travel through multiple rotations relative to one another, a particular sensor 26 may not always enter the region of the nip 12 with the same circumferential portion of the mating roll 11 as it did in a previous rotation. This behavior can be utilized to create data maps corresponding to the surface of the mating roll 11. Different average pressure matrices, each collected and built during different periods of time can be compared with one another to investigate how they vary from one another. Variability between the different data maps can indicate possible problems with the mating roll 11, such as roll surface irregularities, bearing wear, and roll flexing. Variability analysis of the sensor data may also indicate possible problems with upstream or downstream processing equipment, e.g., upstream rolls, an upstream forming wire, an upstream felt or downstream rolls.

The sensing and mating rolls 10 and 11 may be each separated into 14 axial segments. All of the axial segments on the sensing roll 10 may or may not be of the same length, and all of the axial segments on the mating roll 11 also may or may not be of the same length. In the illustrated embodiment, it is presumed that all of the axial segments on the sensing roll 10 are of the same length and all of the axial segments on the mating roll 11 are of the same length. The axial segments on the sensing roll 10 may be aligned with the axial segments on the mating roll 11. Furthermore, the mating roll 11 may be separated into individual circumferential segments such as, for example, 22 circumferential segments, all of substantially the same dimension.

Figure 3:
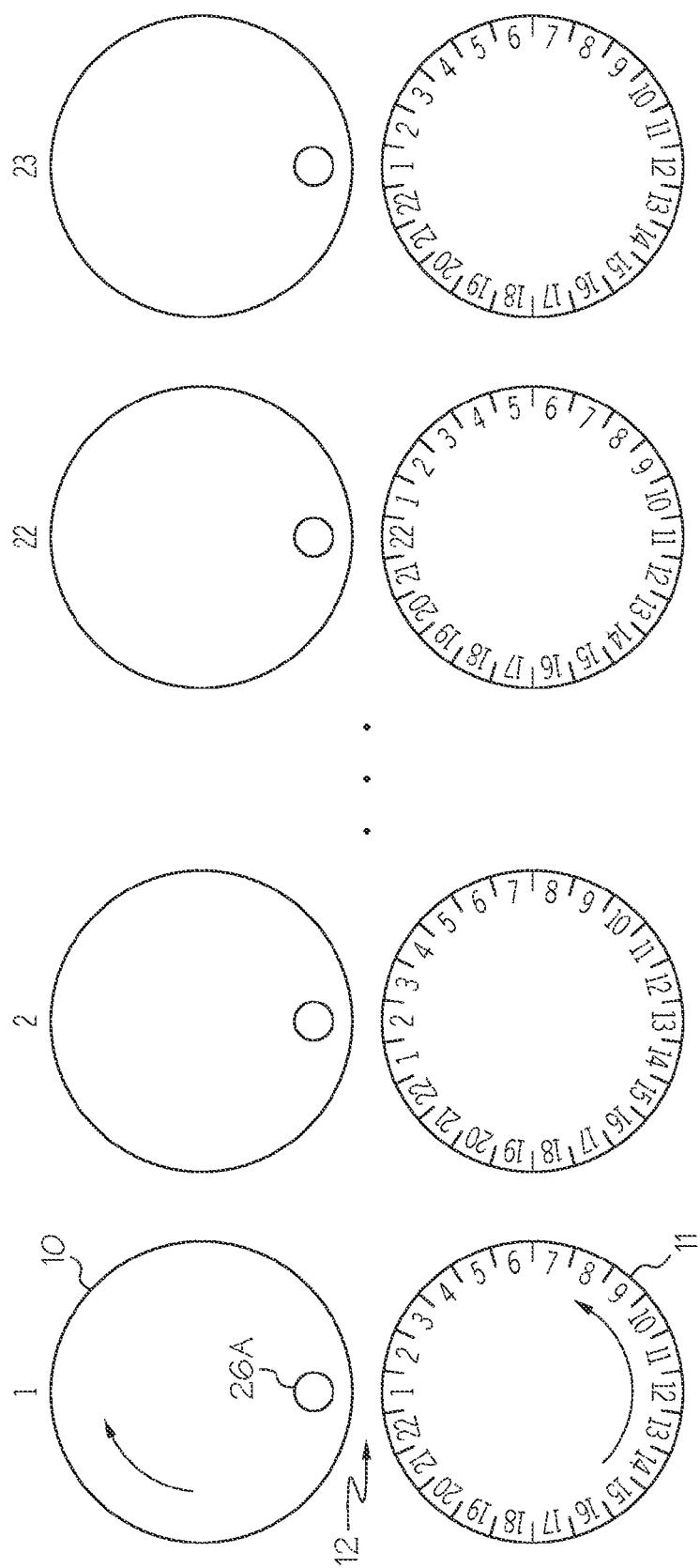
FIG. 3 illustrates how a rotation of the sensing roll and the mating roll can change a circumferential segment of the mating roll that enters a nip region coincidentally with a sensor on each rotation of the sensing roll, in accordance with the principles of the present invention.

FIG. 3 illustrates how rotation of the sensing roll 10 and the mating roll 11 can change a circumferential segment of the mating roll 11 that enters a nip region coincidentally with a sensor on each rotation of the sensing roll 10. FIG. 3 is presented as series of position snapshots from 1 to 23 of the rotating sensing roll 10 which also correspond to 22 rotations of the sensing roll 10 and 23 rotations of the mating roll 11. The left-most portion of FIG. 3 shows a starting position (i.e., where a first sensor reading is collected) and the right-most portion represents a position of the two rolls 10 and 11 after 22 rotations of the sensing roll 10 after the first sensor reading was collected. At the starting position, circumferential segment #1 of the mating roll 11 is positioned in the region of the nip 12 along with the sensor 26A. The mating roll 11, in this example, is rotating slightly faster than the sensing roll 10 such that at a second position snapshot following a complete rotation from the starting position, the sensor 26A is once again positioned in the region of the nip 12 but the mating roll 11 has rotated so that circumferential segment #2 is in the region of the nip 12. The values of FIG. 3 are selected just as examples to illustrate with concrete numbers operating principles of the present invention. In accordance with the example values of FIG. 3, when the sensing roll had completed 22 rotations, the mating roll 11 has completed 23 rotations. Thus, after 21 rotations from the starting position (indicated by position #22 in FIG. 3), the sensor 26A of the sensing roll 10 has been able to collect 22 sensor readings, presuming it collected a reading at the starting position, and has "seen" all portions of the circumference of the mating roll 11. Therefore, 22 circumferential segments can be selected as an example number of circumferential segments. One of ordinary skill will recognize that the mating roll 11 could be broken into more circumferential segments but that it would take more than 22 rotations of the sensing roll 10 to collect data from sensor 26A that corresponds to each of the different circumferential segments.

It would be rare that the period of the mating roll would be an integer ratio of the period of the sensing roll. Hence it is very unlikely that a stationary pattern would be maintained between these rolls and this would tend to even out the sampling of tracking segments, discussed below.

Because the one sensor 26A enters the region of the nip 12 concurrently with different circumferential segments of the mating roll 11 in the illustrated embodiment, the nip pressure measured by the one sensor 26A may vary during sequential roll rotations due to the change in pressure caused by the mating roll 11. Aspects of the present invention contemplates mapping readings, or signals, from each sensor 26 of the set 24 over time to see how the pressure readings, or signals, vary for each sensor due to each sensor entering the region of the nip 12 concurrently with different circumferential segments of the mating roll 11. As noted above, the mapped data may be used to determine possible problems with the mating roll 11 and, as more fully described below, data collection can be performed involving possible problems related to upstream or downstream processing equipment other than the sensing roll 10 and the mating roll 11.

Hence, the present invention contemplates using sensors 26 to measure for rotational variability that is generated by the high speed rotation of the mating roll 11 when pressure signals, or readings, from the sensors 26 are time synchronized to the mating roll position. In order to measure for rotational variability, the mating roll 11 must have some impact on the pressure in the nip 12 to be measured. The dominant impact on the sensed nip pressure will likely be that of the mating roll 11 which directly presses against the sensing roll 10. However, it may be possible to synchronize sensor measurements with upstream rolls (not shown) which form another nip and impact the water content and thickness of the web which affect the nip pressure seen by the sensing roll 10. Furthermore, as rolls (not shown) in a downstream nip may pull the web and cause changes in web tension, it may be possible to also synchronize sensor measurements with these rolls. The sensing and mating rolls 10 and 11 will be used to illustrate the principles of this invention; however all principles are applicable to upstream and downstream processing equipment, such as upstream and downstream rolls, an upstream forming wire or an upstream felt.

Continuing the example of FIG. 3, the mating roll 11 may have rotational characteristics that generate, for example, a sinusoidal pressure pattern which is 8 pounds per square inch (psi) peak-to-peak. In the illustrated example of FIGS. 4A and 4B, to start, the pressure pattern is "0" when circumferential segment #1 of the mating roll 11 is in the region of the nip 12. FIGS. 4A and 4B are a table of how collecting 51 sensor readings from sensor 26A would be associated with the different circumferential segments of the mating roll 11. The left column 402 is the sequential number assigned to the sensor reading and the middle column 404 represents a pressure reading value from sensor 26A according to the sinusoidal pattern described above and right column 406 is the circumferential segment of the mating roll 11 in the region of the nip when a corresponding pressuring reading is taken from the sensor 26A. Each pressure reading value is time-synchronized with the period of rotation of the mating roll 11 by associating that value with one of the circumferential segments of the mating roll 11 that was in the region of the nip 12 when the pressure reading was sensed.

One convenient way to characterize the difference in periodicity is using units-of-measure that measure that difference in terms of time segments, e.g., 22 time segments in the illustrated embodiment. The length of each time segment is the mating roll period divided by the number of predefined time segments. As discussed below, the predefined number of time segments may correspond to a predefined number of mating roll circumferential segments. A period of the sensing roll 10 can be described as being x time segments smaller/larger than a period of the mating roll 11. For example, according to FIG. 3, the sensing roll 10 may have a period that is 1.0 mating roll time segment more than the period of the mating roll 11 (equivalently, the mating roll 11 can have a period that is 1.0 mating roll time segment smaller than the period of the sensing roll). In such an example, as the sensing roll 10 makes one complete revolution, the mating roll 11 will make more than a complete revolution by an amount equal to 1.0 mating roll time segment due to it having a smaller period than the sensing roll 10.

As noted above, the 22 time segments of the mating roll period can correspond to 22 circumferential segments around the mating roll 11. Thus, even though, at a conceptual level, it is the period of the mating roll 11 that is being separated into a plurality of time segments, that concept can correspond to a physical circumference of the mating roll 11, wherein each individual time segment of the mating roll period also corresponds to a circumferential segment around the mating roll 11. Accordingly, differences in rotational periods between the sensing roll 10 and the mating roll 11 measured in units of "time segments" can just as easily be considered in units of "circumferential segments." In the description of at least some embodiments of the present invention below, reference to "circumferential segments" is provided as an aid in understanding aspects of an example embodiment of the present invention. However, one of ordinary skill will recognize that "time segments" and mating roll periodicity could be utilized as well without departing from the scope of the present invention. The "circumferential segments" and "time segments" can also be referred to generically as "tracking segments"; this latter term encompassing both types of segments associated with the mating roll 11 and other periodic components as described below.

As mentioned above, data similar to that of FIGS. 4A and 4B is captured for each sensor 26 of the set 24. Thus, as each sensor 26 arrives at the region of the nip 12 and senses a pressure reading, a particular mating roll outer surface portion at an axial location corresponding to that sensor and at one of the 22 circumferential segments of the mating roll 11 will also be in the nip 12. Determining the mating roll segment that is in the nip 12 can be accomplished in a variety of different ways. One way involves indexing a particular one of the 22 mating roll segments with a trigger signal that is fired each time the mating roll 11 completes one revolution; a time period since the last trigger signal can be used to determine which of the 22 segments (measured relative to the indexed segment) is in the nip 12. For example, if the time between each firing of the trigger signal is 220 ms, then each time segment is 10.0 ms, which corresponds to one of the 22 mating roll circumferential segments. A pressure signal generated by a sensor 26 in the nip region occurring at 30 ms after the trigger signal would be assigned to time segment 3 as three 10.0 ms segments will have passed, e.g., the nip region, from when the trigger signal is made to when the pressure signal is generated.

Figure 5:
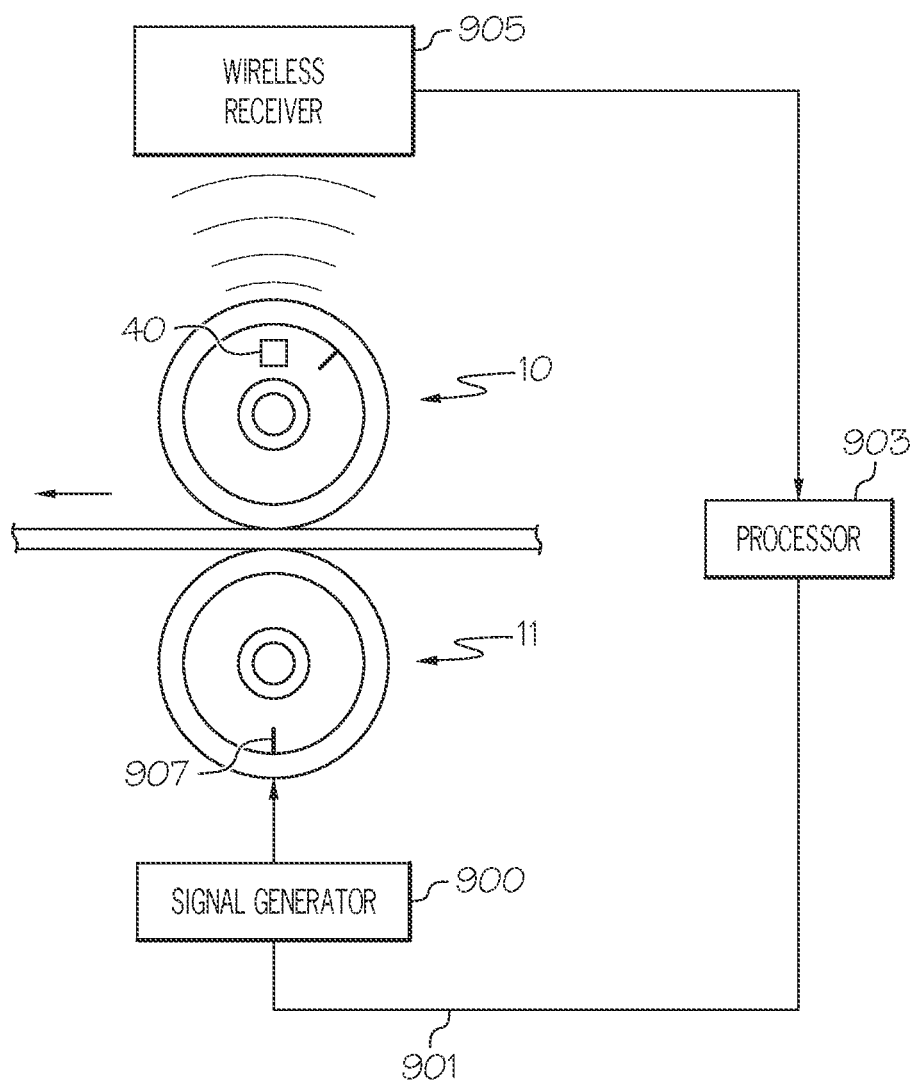
FIG. 5 is a schematic drawing showing the basic architecture of a particular monitoring system and paper processing line in accordance with the principles of the present invention.

In FIG. 5, a processor 903 can be present that can generate a real-time nip profile. In addition, the processor 903 can also receive a trigger signal 901 related to the rotation of the mating roll 11. As just described, some circumferential segment or position 907 of the mating roll 11 can be indexed or encoded such that a signal generator 900 detects the encoded segment 907 and generates the trigger signal 901 each time the signal generator 900 determines that the segment 907 of the mating roll 11 completes another full rotation. When the mating roll 11 is rotated such that the circumferential position or segment 907 is aligned with a detector portion of the signal generator 900, then the one of the 22 circumferential segments that happens to be positioned in the nip region can arbitrarily be labeled as the first circumferential segment such that the other circumferential segments can be numbered relative to this first segment. This particular rotational position of the mating roll 11 can be considered a reference position. As the mating roll 11 rotates, its rotational position will vary relative to that reference position and the amount of this variance determines which of the 22 circumferential segments will be positioned in the nip region. Accordingly, based on the rotational position of the mating roll 11 relative to that reference position a determination can be made as to which of the 22 circumferential segments is in the nip region when a particular sensor 26 generates a pressure signal. FIG. 5 illustrates the overall architecture of one particular system for monitoring paper production product quality. The system of FIG. 5 includes the processor 903, noted above, which defines a measurement and control system that evaluates and analyzes operation of the roll 11. The processor 903 comprises any device which receives input data, processes that data through computer instructions, and generates output data. Such a processor can be a hand-held device, laptop or notebook computer, desktop computer, microcomputer, digital signal processor (DSP), mainframe, server, other programmable computer devices, or any combination thereof. The processor 903 may also be implemented using programmable logic devices such as field programmable gate arrays (FPGAs) or, alternatively, realized as application specific integrated circuits (ASICs) or similar devices. The processor 903 may calculate and display the real-time average pressure profile calculated at the end of the prior collection session. For example, the pressure measurements from the sensors 26 can be sent to a wireless receiver 905 from transmitter(s) 40 located on the sensing roll 10. The signals can then be communicated to the processor 903. It is contemplated that the processor 903, in addition to calculating a real-time average pressure profile, may use the real-time average pressure profile to automatically adjust crown and loading mechanisms to achieve a flat pressure profile. Crown and loading mechanisms may also be adjusted manually by an operator using information provided by the real-time average pressure profile.

There are other ways to determine the position of the mating roll 11. One way is to use a high precision tachometer that divides the rotation of the roll 11 into a number of divisions, perhaps 440. In this example, each time segment would be 20 positions on the high precision tachometer. All methods of determining the position of the mating roll are included in this invention.

Figure 6:
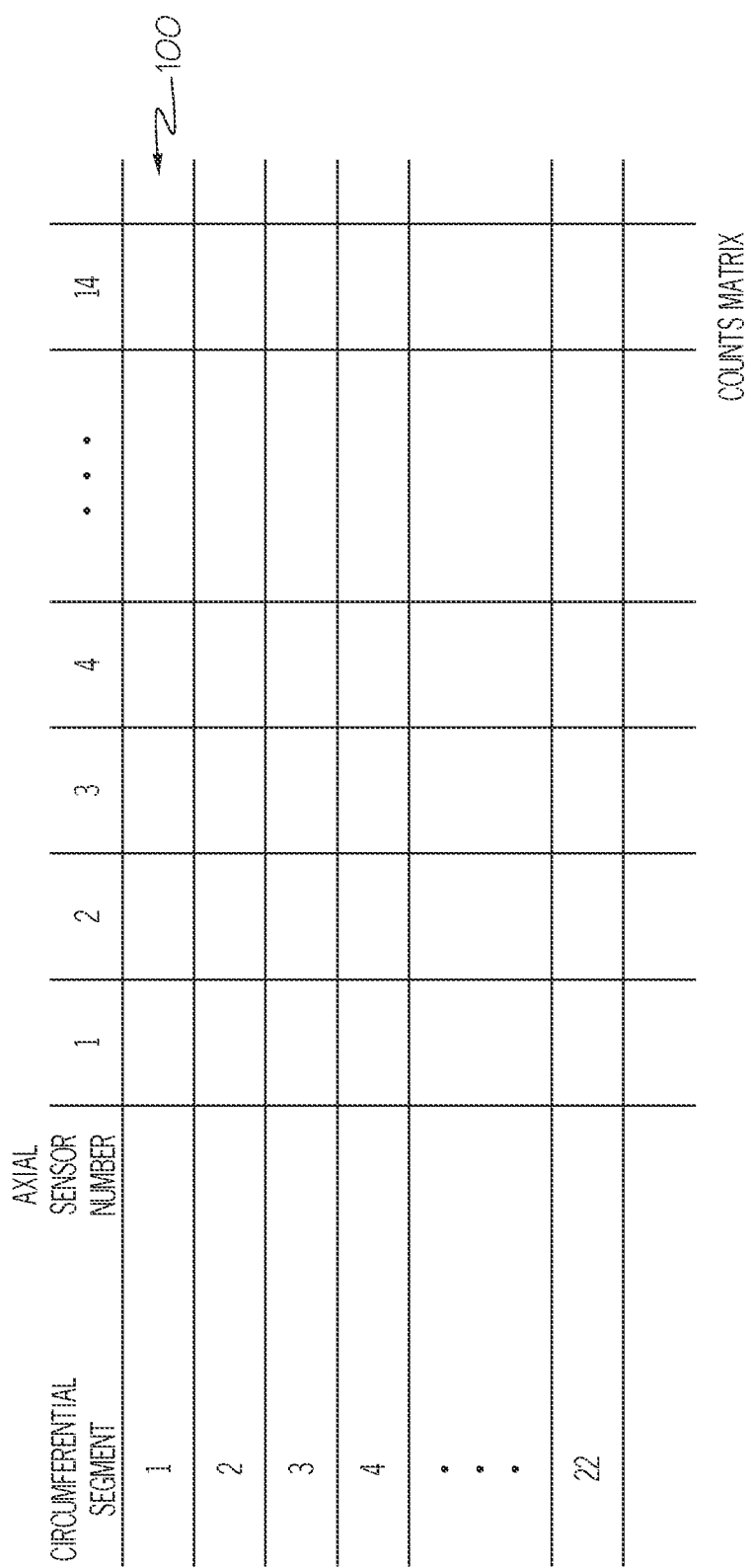

In an example environment in which there are 14 axially arranged sensors 26, each of which can be uniquely referred to using an axial segment index value that ranges from "1" to "14", and there are 22 circumferential segments on the mating roll 11 (or time segments), each of which can be uniquely referred to using a tracking segment index value ranging from "1" to "22", there are 308 (i.e., 22×14=308) unique permutations of pairs consisting of a sensor number and a circumferential segment number (or time segment number), wherein each permutation is identifiable by a two-element set comprising a respective axial segment index value and a respective tracking segment index value. In the illustrated embodiment, the sensor numbers also correspond to the mating roll axial segments. Therefore the data collected can be considered a 22×14 matrix as depicted in FIG. 6. Each row of FIG. 6 represents one of the 22 mating roll circumferential segments (or time segments) and each column represents one of the 14 axially arranged sensors 26 and, thus, each cell represents one of the possible 308 permutations. Each column also corresponds to a mating roll outer surface portion at an axial location aligned with and corresponding to the sensor 26 assigned that column. Each cell represents a combination of a sensor number (or axial segment number) and a particular mating roll circumferential segment (or time segment). For example, cell 100 represents a value that will relate to a pressure reading that occurred when sensor number 14 (number 14 of the 1-14 sensors defining the set 24) entered the region of the nip 12 concurrently with a mating roll outer surface portion at an axial location corresponding to sensor number 14 and mating roll circumferential segment number 1 (or time segment number 1). Thus, each cell of the matrix represents a unique permutation from among all the possible permutations of different axial segment numbers (e.g., 1-14) and circumferential segment numbers (e.g., 1-22) (or time segments 1-22). A value stored in a particular matrix element is thereby associated with one particular permutation of possible axial segment numbers and circumferential segment numbers (or time segments).

The matrix of FIG. 6 can, for example, be a "counts" matrix wherein each cell represents the number of times a particular sensor and a particular mating roll outer surface portion at an axial location corresponding to that sensor and a particular mating roll circumferential segment were concurrently in the region of the nip 12 to acquire a pressure reading value. FIG. 7 illustrates a similarly sized matrix (i.e., 22×14) but the values within the matrix cells are different from those of FIG. 6. The cell 200 still represents a value that is related to sensor number 14 (or axial segment 14, out of 1-14 axial segments, of the mating roll 11) and circumferential segment 1 but, in this example, the value is a cumulative total of pressure readings, e.g., in pounds/inch, acquired by the sensor for that circumferential segment during a plurality of rotations of the sensing roll 10. Thus, each time sensor number 14 happens to enter the region of the nip 12 along with the mating roll circumferential segment number 1, the acquired pressure reading value is summed with the contents already in the cell 200. Each of the 308 cells in this matrix of FIG. 7 is calculated in an analogous manner for their respective, associated sensors and segments.

Figure 8:
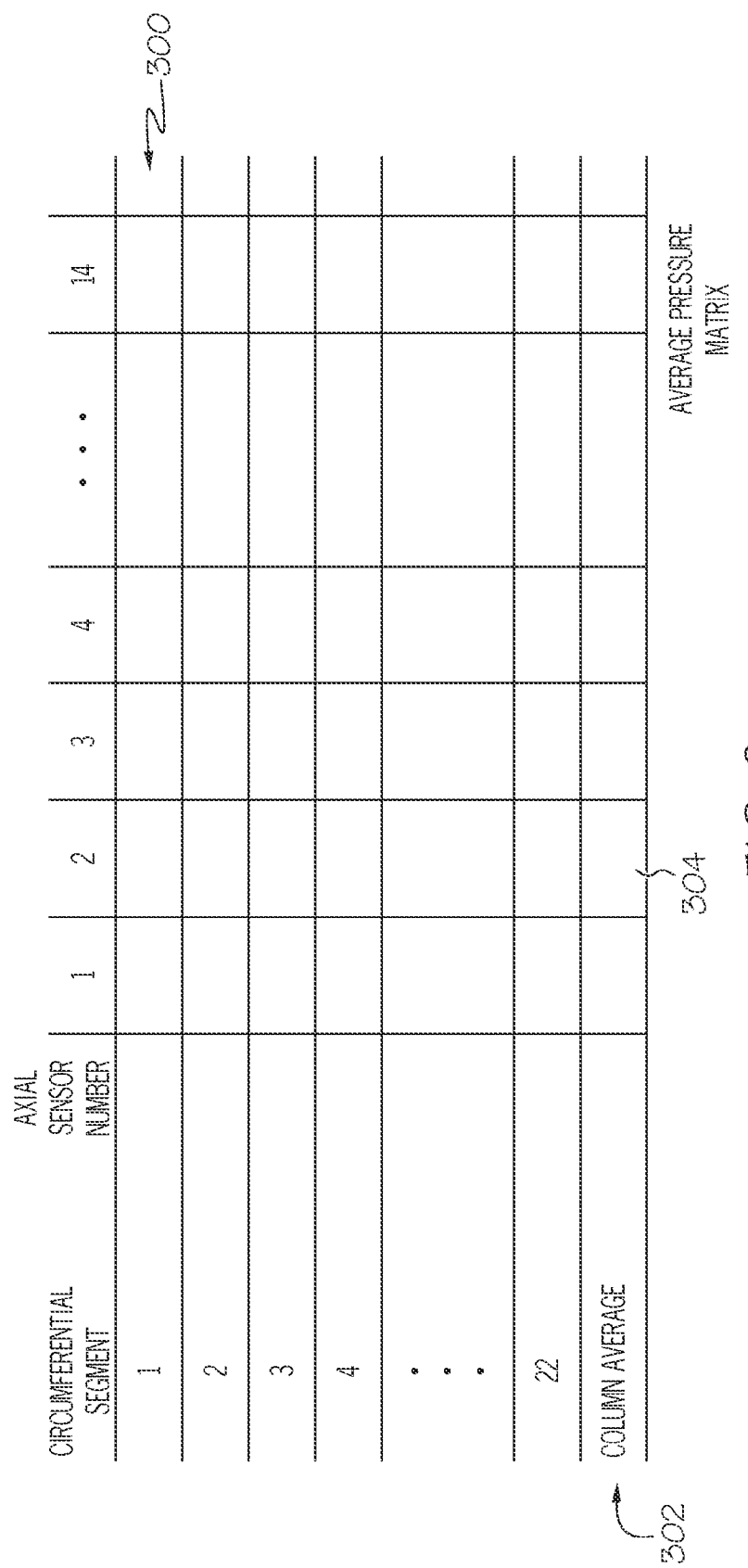

From the matrices of FIG. 6 and FIG. 7, an average pressure matrix depicted in FIG. 8 can be calculated. For example, cell 100 includes the number of pressure readings associated with sensor number 14 (or axial segment 14 of the mating roll 11) and circumferential segment number 1 while cell 200 includes the total or summation of all those pressure readings. Thus, dividing cell 200 by cell 100 provides an average pressure value for that particular permutation of sensor number and mating roll circumferential segment number which entered the region of the nip 12 concurrently.

As a result, the matrix of FIG. 8 represents an average pressure value that is sensed for each particular sensor number and mating roll circumferential segment number. The length of time such data is collected determines how many different pressure readings are used in such calculations.

The raw pressure readings, or pressure signals, from the sensors 26 can be affected by a variety of components in the system that move the web of material. In particular, the average values in the average pressure matrix of FIG. 8 are related to variability synchronized to the mating roll 11. However, there may be other variability components that are not synchronized with the mating roll 11 such as variability in a cross direction (CD), shown in FIG. 2. One measure of this CD variability is captured by calculating an average for each column of the average pressure matrix. Thus, the average pressure matrix of FIG. 8 can also include a row 302 that represents a column average value. Each of the 14 columns may have 22 cells that can be averaged together to calculate an average value for that column. For example, cell 304 would be the average value in the 22 cells of the second column of the average pressure matrix.

Individual collection sessions of pressure readings to fill the matrices of FIGS. 6, 7, and 8 may be too short to build robust and complete matrices due to data buffer and battery life limitations of data acquisition systems in communication with the sensing roll 10. In such cases, consecutive collection sessions can be combined by not zeroing the matrices (i.e., counts and summation matrices) upon starting a new collection session or combining the separate matrices collected in a post hoc fashion. Consequently, collections may be stopped and restarted without loss of data fidelity as long as the synchronization of the mating roll is maintained. In particular, combining multiple collection sessions that are separated by gaps in time can be beneficial to help populate the matrices. For example, if the period difference between the two rolls were closer to 2.001 instead of 1.0 time or circumferential segments, the collection would have a tendency to collect only evenly numbered time/circumferential segments in the short term (i.e., evenly numbered segments are those that are offset an even number of segments from a starting segment) until sufficient time has passed to move the collection into the odd numbered time/circumferential segments. Combining collection sessions separated by a long time delay may help to shift the collection so that data is more uniformly captured for all the different time/circumferential segments because there is no expectation that the period of the mating roll will be related to arbitrary time gaps between collection sessions.

Figure 9:
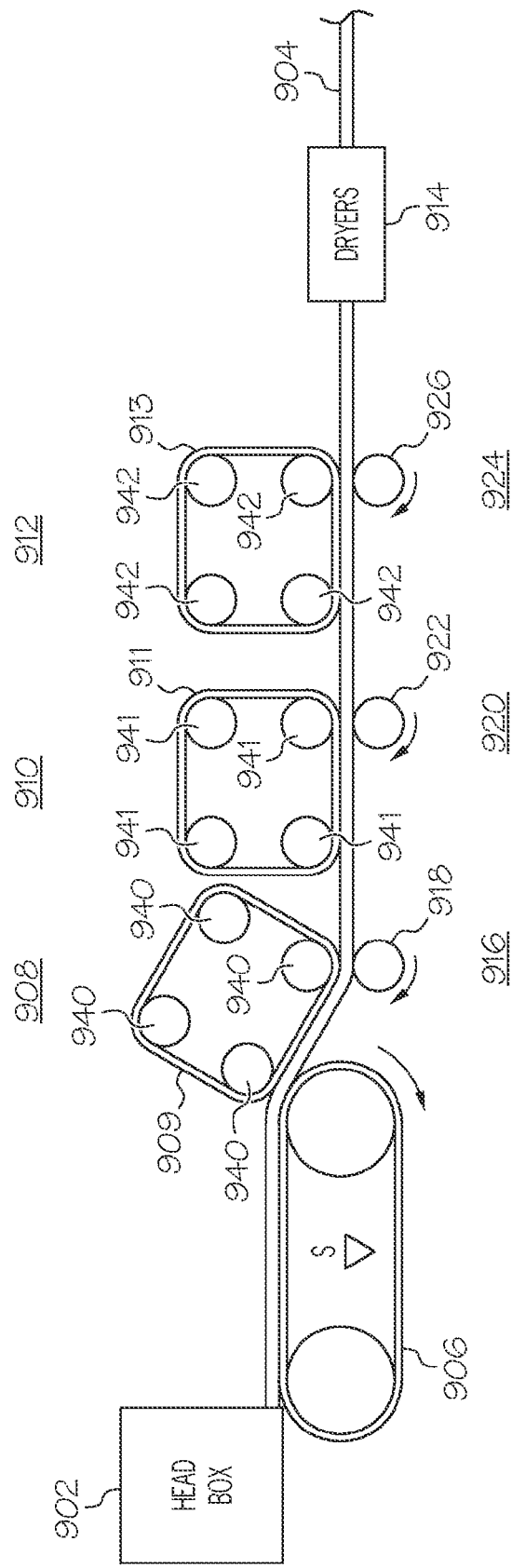
FIG. 9 illustrates an exemplary process configuration in accordance with the principles of the present invention in which each of the various circles represents a rotating component (e.g. a roll) that help propels a web of material 904 through the process.

The press of FIG. 1 can be located at a number of different positions within the chain or serial sequence of different components that are part of a modern paper processing operation. FIG. 9 illustrates an exemplary process and system configuration in accordance with the principles of the present invention in which each of the various circles represents a rotating component (e.g. a roll) that helps propel a web of material 904 through the process/system. The process starts at a headbox 902 where a fiber slurry is distributed over a wire mesh 906 which allows liquid to readily drain from the slurry. From the wire mesh 906, the web of material 904 travels to a first wet felt station 908 that helps dry the web of material 904. A felt 909 at the first station 908 is a continuous band arranged to travel in a loop pattern around a plurality of rolls 940. In the example of FIG. 9, there are four rolls 940. The felt 909 enters a press area 916 between one of the rolls 940 and a sensing roll 918 with the web of material 904. The sensing roll 918 may operate similar to the sensing roll 10 of FIG. 1. Downstream from the wet felt station 908 is another wet felt station 910 having its own felt 911 traveling in a loop pattern around another set of four rolls 941. There is also a second press region 920 having a press roll 922, which, in the illustrated embodiment, is not a sensing roll. The last wet felt station 912 has a felt 913 traveling in a loop pattern around another set of four rolls 942. The felt 913 together with the web of material 904 is pressed by one of the rolls 942 and a second sensing roll 926 in a third press region 924. The felts 909, 911, 913 are pressed into the web of material in their respective press regions 916, 920, 924 to absorb liquid from the web of material 904. In this manner, the web of material 904 is drier after passing through the wet felt stations 908, 910, 912. By "drier" it is meant that the fibers in the web of material 904 have a higher percentage by weight of fibers after the wet felt stations than before. Additional drying can be performed, however, by separate dryers 914 before the web of material 904 progresses further downstream in the process of FIG. 9. The various felts and rolls of FIG. 9, and the spacing between the different stations are not shown to scale but are provided to simplify description of various aspects of different embodiments of the present invention. For example, the web of material 904 does not travel unsupported for long distances. Typically, the web of material 904 will be removed from one felt and be picked up by a next-downstream felt. In additional, the web of material can be supported by other supporting rolls and by tension between various rolls.

A felt (e.g., 909) can have variations in its material that cause different effects on the web of material 904. For example, seams, worn spots, or even holes, may not be as effective at removing liquid from the web of material 904 as portions of the felt 909 that are in good condition. Thus, some regions of the web of material 904 may have more or less water relative to other regions of the web of material 904 due to variations in the felt 909, i.e., a worn portion of the felt 909 may not remove as much moisture from a region of the web of material that it engages as compared to a portion of the felt that is in good condition and engages another region of the web material. When a wetter region of the web of material travels through a nip in one of the press regions (e.g. 916), a pressure sensed by a sensor on a sensing roll (e.g., 918) may be greater than when a drier region of the web material 904 passes through the nip. Also, the felts 909, 911, 913 may be porous in construction and, thus, some portions of a felt may become clogged with debris, fibers, or other contaminants. When a clogged portion of a felt is pressed into, or otherwise interacts with, and affects a region of the web of material 904, not as much moisture will be removed from that region of the web of material as compared with other regions of the web of material 904 that were pressed into portions of the felt that were not clogged, or not as clogged. When that region of the web of material that did not have as much moisture removed travels through a nip in one of the press regions (e.g. 916), a pressure sensed by a sensor on a sensing roll (e.g., 918) may be greater than when the other regions that experienced more moisture being removed pass through the nip. Further, when a clogged portion of a felt travels through the nip in one of the press regions (e.g., 916), a pressure sensed by a sensor on a sensing roll (e.g., 918) may be greater than when a non-clogged portion of the felt passes through the nip. Thus, a pressure reading sensed in a nip can reveal effects that a felt had on the web of material 904 upstream of that nip in addition to revealing effects from a felt passing through the nip.

Figure 10:
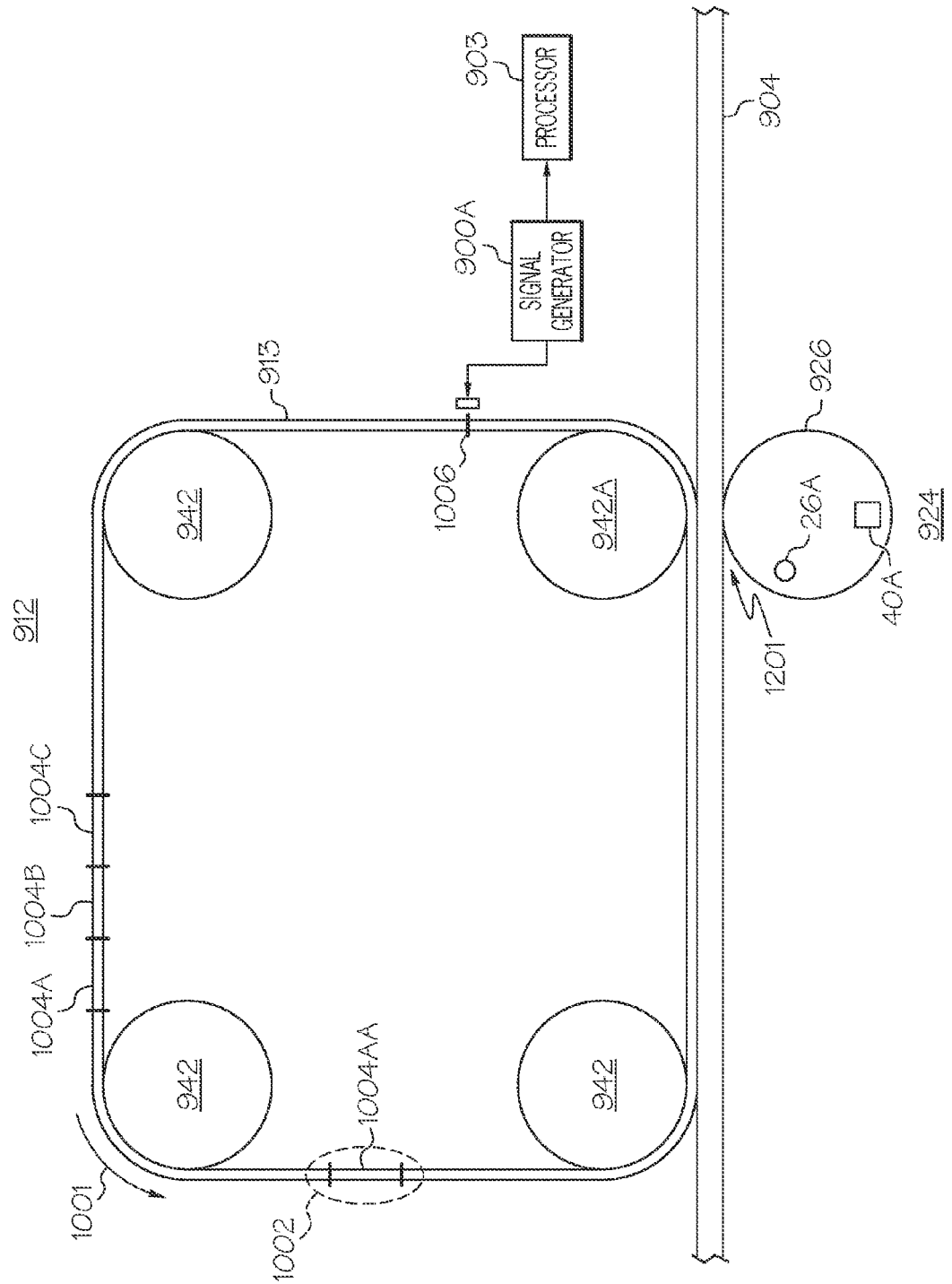
FIG. 10 illustrates a detailed view of wet felt station in accordance with the principles of the present invention.

FIG. 10 illustrates a detailed view of the wet felt station 912 illustrated in FIG. 9 in accordance with the principles of the present invention. The felt 913 extends in a cross-machine direction into the plane of the drawing sheet and, as described earlier, the felt 913 is a continuous band arranged to travel around in a loop pattern around the four rolls 942 in a direction shown by arrow 1001. Accordingly, the felt 913 has a regular period of rotation around this loop pattern. Thus, different portions of the felt 913 each periodically travel through a region of the nip 1201 along with the web of material 904. The region of the nip 1201 is formed between the sensing roll 926 and a mating roll 942A similar to the arrangement described earlier with respect to FIGS. 1-3.

The felt 913 may be separated into a predefined number of axial segments, such as 14 in the illustrated embodiment, such that the 14 axial segments of the felt 913 are axially aligned with 14 axially spaced apart sensors 26 provided on the sensing roll 926.

The felt station 912 can have a period of rotation that can be divided into different tracking segments in the same manner as the period of rotation of the mating roll 11 was divided into 22 tracking segments as described earlier. Thus, the tracking segments related to the felt 913 can either be a plurality of time segments of the period of rotation of the continuous felt band 913 around the loop pattern or a plurality of physical circumferential segments on the continuous felt band 913. The segments of the felt, only segments 1004A, 1004B, 1004C, 1004AA are designated in FIG. 10 with the remaining segments not being specifically identified, may, for example, be separate circumferential segments with each having an index relative to a fixed reference position 1006 on the felt 913.

As an example, the reference position 1006 can make 1 complete rotation around the loop pattern in the same amount of time that the sensing roll makes 31 rotations. Accordingly, the felt 913 can be segmented into 31 different physical circumferential segments 1004A-1004AE or, equivalently, the period of rotation of the felt 913 around its loop can be segmented into 31 time-based segments. In other words, because the respective portions of the felt 913 and the sensing roll 926 at a region of the nip 1201 are travelling at substantially the same linear speed the circumference of the loop of felt 913 will, for this example, be about 31 times greater than the circumference of the sensing roll 926. In the drawings, as mentioned earlier, various rolls, loops of felt, and wire meshes are not drawn to scale but, instead, are presented so as not to obscure aspects of the present invention.

Using the same principles as used when describing the mating roll 11 of FIG. 3, the felt 913 can be segmented into 31 tracking segments, for example. As an example and as will be discussed further below, there can be a portion 1002 of the felt 913 located at a circumferential segment 1004AA of the felt 913 that defines tracking segment #27 and at an axial location aligned with a pressure sensor 26A (one of 14 pressure sensors on the sensing roll 926 in the illustrated embodiment) on the sensing roll 926 that causes an increase in pressure in the region of the nip 1201 of approximately 4 psi as compared to a pressure increase of about 0 psi for all other portions of the felt 913 at different axial and circumferential locations. In a manner similar to how data in FIGS. 4A and 4B was collected in a manner time-synchronized with the rotational period of the mating roll 11, sensor readings from the region of the nip 1201 defined by the sensing roll 926 and the mating roll 942A can also be collected in a manner time-synchronized with the period of rotation of the felt 913.

In FIG. 10, a processor 903 can be present that can receive a trigger signal related to the rotation of the felt 913. Some circumferential segment or position 1006 of the felt 913 can be indexed or encoded such that a signal generator 900A detects the encoded segment 1006 and generates a trigger signal each time the signal generator 900A determines that the segment 1006 of the felt 913 completes another full rotation. When the felt 913 is rotated such that the circumferential position or segment 1006 is aligned with a detector portion of the signal generator 900A, then the one of the 31 circumferential segments that happens to be positioned in the nip region can arbitrarily be labeled as the first circumferential segment such that the other circumferential segments can be numbered relative to this first segment. This particular rotational position of the felt 913 can be considered a reference position. As the felt 913 rotates, its rotational position will vary relative to that reference position and the amount of this variance determines which of the 31 circumferential segments will be positioned in a region of the nip 1201. Accordingly, based on the rotational position of the felt 913 relative to that reference position a determination can be made as to which of the 31 circumferential segments is in the nip region when a particular sensor 26A generates a pressure signal.

FIGS. 14A-14C is a table of how collecting 86 sensor readings from sensor 26A (one of 14 pressure sensors on the sensing roll 926 in the illustrated embodiment) would be associated with the different tracking segments (e.g., 31 tracking segments in the illustrated embodiment with only segments 1004A, 1004B, 1004C and 1004AA being designated in FIG. 10) of the felt 913. The data in FIGS. 4A and 4B and 14A-14C is simulated data and, as noted before, could be generated by rolls and felts having different relative sizes as compared to those depicted in the figures. As a simulation, the data is nicely behaved and the tracking segments advance one segment per sensing roll rotation. Actual data may not be this well behaved as there may be no relation to the tracking segment length and sensing roll rotation period. Actual collections therefore are like to have skips (consecutive readings in non-consecutive tracking segments) and repeats (consecutive readings in the same tracking segment). The result of this is that the tracking segments are not evenly sampled. However, as discussed in more detail in U.S. patent application Ser. No. 14/268,672 entitled METHOD AND SYSTEM ASSOCIATED WITH A SENSING ROLL AND A MATING ROLL FOR COLLECTING ROLL DATA, filed May 2, 2014, which was incorporated by reference above, if data is collected for a sufficient amount of time, it is unlikely that any tracking segments will not have corresponding sensed data even if there is unevenness in the data sampling per tracking segment. Similar to FIGS. 4A and 4B, the left column 402A is the sequential number assigned to the sensor reading and the next column 404A represents a raw nip pressure reading value when the pressure sensor 26A enters the region of the nip 1201 defined by the sensing roll 926 and the mating roll 942A. As discussed above, each pressure reading value in column 404A can be time-synchronized with the period of rotation of the mating roll 942A by associating that value with one of the 22 circumferential segments, see column 406A, of the mating roll 942A that was in the region of the nip 1201 when the pressure reading was sensed. In addition, each pressure reading value in column 404A can also be time-synchronized with the period of rotation of the felt 913 by associating that value with one of the 31 tracking segments, in column 1402, of the felt 913 that was in the region of the nip 1201 when the pressure reading was sensed.

Similar to the mating roll 11 being segmented into axial segments corresponding to the different locations of the sensors 26 on the sensing roll 10, the felt 913 can be segmented into cross-machine direction (or axial) segments as well, as noted above. FIG. 11 illustrates a felt 913 in relation to a sensing roll 926 in accordance with the principles of the present invention. In particular, the view of FIG. 11 is from the perspective of being below the sensing roll 926 and looking upwards towards the felt 913. The felt 913 has a width W2 that is substantially similar to a width W1 of the web of material 904 that are both typically smaller than the length L of the sensing roll 926. Thus, either or both of the web of material 904 and the felt 913 can be broken into multiple axial segments 1102 that each correspond to one of the sensor locations on the sensing roll 926, e.g., 14 axial segments in the illustrated embodiment. Accordingly, similar matrices of "counts", "sums" and "averages" as described in FIGS. 6-8 can be constructed for the data from FIGS. 14A-14C but arranged in a manner time-synchronized with the period of the felt 913. In the example provided above, each such matrix would have (31×14), or 434, cells.

Figure 12A:
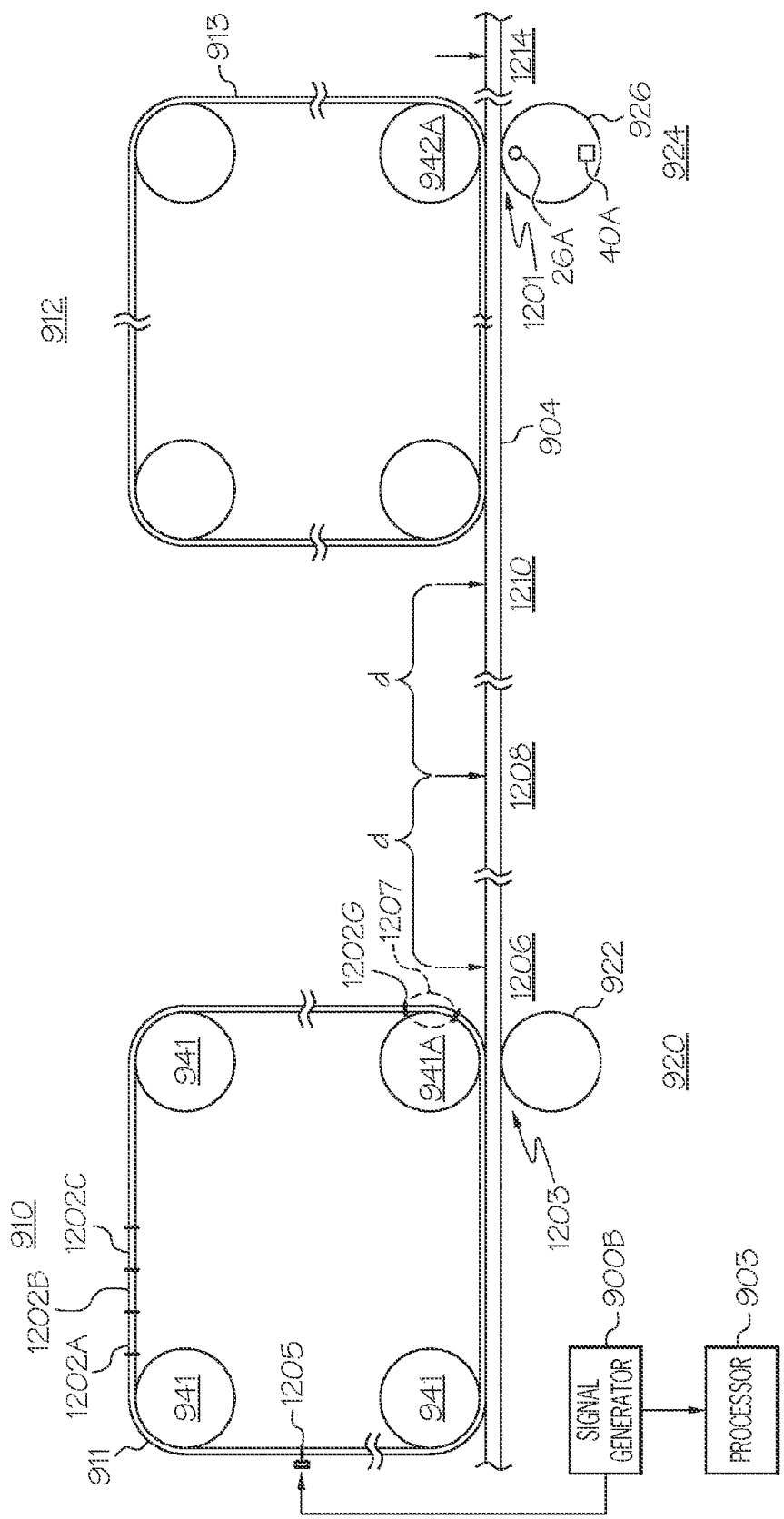

In the example stations of FIG. 9 and as noted above, not every wet felt station 908, 910, 912 necessarily has a press region 916, 920, 924 that includes a sensing roll. FIG. 12A illustrates the wet felt station 912 with the press region 924 having the sensing roll 926 that is downstream from the wet felt station 910 that does not have a press region with a sensing roll in accordance with the principles of the present invention.

In FIG. 12A, the sensing roll 926 is associated with the region of the nip 1201 of the press region 924 while the press region 920 of the wet felt station 910 may not necessarily include a sensing roll. However, the felt 911 of the wet felt station 910 still rotates as a continuous band in a loop pattern similar to the manner described with respect to the felt 913 of FIG. 10. Accordingly, the felt 911 has a regular period of rotation around this loop pattern. Thus, different portions of the felt 911 each periodically contact a region of the web of material 904 upstream from the region of the nip 1201 even though the felt 911 itself does not travel through the region of the nip 1201.

In FIG. 12A, a portion 1207 of the felt 911 (having corresponding axial and circumferential locations on the felt 911) is shown that contacts the web of material 904 in a periodic manner as the web of material 904 passes through the region of the nip 1203 of the press region 920. Regions 1206, 1208, 1210 and 1214 (each having corresponding axial and circumferential positions on the web of material 904), evenly spaced by a distance d in the circumferential direction, of the web of material 904 that were in the region of the nip 1203 concurrently with the portion 1207 of the felt 911 are shown in FIG. 12A, i.e., in the illustrated embodiment the felt portion 1207 engages each of the web of material regions 1206, 1208, 1210 and 1214 at different occurrences or times when in the nip 1203. When those web of material regions 1206, 1208, 1210 and 1214 travel through the region of the nip 1201 of the downstream felt station 912, the pressure readings from the sensing roll 926 in the downstream felt station 912 can be affected by the impact that the felt portion 1207 had on the web of material regions 1206, 1208, 1210 and 1214 that it contacted in the upstream nip 1203. As explained earlier, the condition of the felt 911 as it is pressed into the web of material 904 can affect, for example, the amount of moisture that is drawn out from the contacted region of the web of material 904 or other characteristics of the web of material 904. Thus, some regions of the web of material 904 may be wetter or drier relative to one another and cause higher or lower pressure readings when passing through the region of the nip 1201.

The felt station 910 can have a period of rotation that can be divided into different time-based tracking segments of the period of rotation of the continuous band around the loop pattern of the four rolls 941. Also, the felt 911 can be divided into a plurality of physical circumferential tracking segments on the continuous band. In the illustrated embodiment, the felt 911 comprises 37 physical circumferential segments, with only four segments 1202A, 1202B, 1202C, 1202G being designated in FIG. 12A. The 37 physical segments, may, for example, be separate circumferential segments with each having an index relative to a fixed reference position 1205 on the felt 911. As discussed below, a particular time-based tracking segment, e.g., #5, may not correspond to a physical circumferential segment having that same index value.

Returning to FIGS. 14A-14C, each of the simulated raw pressure readings from the region of the nip 1201 that are shown in column 404A can be associated with a specific single time-based tracking segment of the period of rotation of the felt 911. These time-based tracking segments can then be correlated to a specific physical circumferential segment of the felt 911 as well. Thus, the table of FIGS. 14A-14C also shows how collecting 86 sensor readings from the sensor 26A (one of 14 pressure sensors on the sensing roll 926) would be associated with different time-based tracking segments, shown in column 1404 which, in turn, can be correlated to the different physical circumferential tracking segments (e.g., 37 physical tracking segments with only 1202A, 1202B, 1202C, 1202G being designated in FIG. 12A) of the felt 911. As described earlier, the left column 402A is the sequential number assigned to the sensor reading and the next column 404A represents a simulated raw pressure reading sensed at the region of the nip 1201 by the sensor 26A on the sensing roll 926. Each such pressure reading will have a value that is related to the regions of the web of material 904 passing through the nip 1201. As an example, see FIG. 12A, the portion 1207 of the felt 911 is located at the circumferential segment 1202G of the felt 911, which segment 1202G may define physical circumferential segment #7, and at an axial location that is axially aligned with the pressure sensor 26A on the sensing roll 926 in the downstream nip 1201. The felt portion 1207 may be damaged such that it does not remove as much moisture from a region of the web of material 904 it contacts as compared to other felt portions that remove a greater amount of moisture from the web of material regions they contact. Hence, because the felt portion 1207 removes less moisture content from a corresponding web of material region that it contacts, that web of material region, in turn, causes an increase in pressure in the region of the nip 1201, e.g., of approximately 2 psi in the illustrated example, as compared to a pressure increase of about 0 psi for all other web of material regions.

Time-synchronizing the values in column 404A with the period of rotation of the felt 911 can be accomplished by associating that pressure reading value with one of the 37 time-based tracking segments of the period of rotation of the felt 911 that correspond to when the pressure reading was sensed.

As an example, the reference position 1205 on the felt 911 can make 1 complete rotation around the loop pattern around the rolls 941 in the same amount of time that the sensing roll 926 in the downstream nip 1201 makes 37 rotations. Thus, the felt 911 advances by the length of one of the physical tracking segments (e.g., 1202A) for every rotation of the sensing roll 926. As an example and as mentioned above, the portion 1207 of the felt 911 is located at the circumferential segment 1202G of the felt 911, which segment 1202G may define the physical circumferential segment #7 and at an axial location that is axially aligned with the pressure sensor 26A on the sensing roll 926 in the downstream nip 1201.

Thus, a signal generator 900B generates a periodic time reference signal when the reference position 1205 of the felt 911 is adjacent the signal generator 900B. This is the reference signal from which a time-based tracking segment of the period of rotation of the felt 911 can be calculated as the sensor 26A on sensing roll 926 passes through the region of the nip 1201. As one example, when a pressure reading is sensed and generated by the pressure sensor 26A of the sensing roll 926, the processor 903 will determine the elapsed time period in $1/37$ increments since the last reference signal was generated by the signal generator 900B. If a pressure reading was generated by the sensor 26A of the sensing roll 926 twenty-five ($1/37$) time increments from when the last reference signal was generated, this would correspond to $25/37$ of the total period of rotation of the felt 911. Thus, the pressure reading sensed at the nip 1201 can be associated with time-based tracking segment #25. Thus, the felt rotational period can comprise m time-based tracking segments, each having a respective, unique index value x in the range of: 1, 2, . . . , m (e.g., m=37)

In a manner similar to how data in FIGS. 4A and 4B and FIGS. 14A-14C was arranged, or stored, in a manner time-synchronized with the rotational period of the mating roll 942A and the felt 913, sensor readings from the region of the nip 1201 could also be arranged, or stored, in a manner time-synchronized with the period of rotation of the felt 911.

For the felt 911, the time-based tracking segment numbers (e.g., time-based tracking segment #25) refer to logical segments of the period of rotation of the felt 911 which have occurred from when the reference signal was generated by the signal generator 900B until a pressure reading is sensed and generated by the pressure sensor 26A of the sensing roll 926. However, these initial time-based tracking segment numbers do not necessarily correspond to an identical physical circumferential segment on the felt 911 as measured from the reference location 1205. In other words, a region of the web of material in the region of the nip 1201 concurrently with sensor 26A may arrive at the $25^{th}$ time segment of the period of rotation of the felt 911 but that region of the web of material 904 was not necessarily pressed in the nip region 1203 by the physical $25^{th}$ circumferential segment of the felt 911 as measured from the reference location 1205. There is a delay between felt 911 and nip 1203 impacting the properties of the web and the sensing of this change at a region of the nip 1201. In general, variations in the felt 911 while in the nip 1203 can impact the amount of moisture in the region of the web of material 904 concurrently in the nip 1203 and also the thickness of caliper of the web. These differences in moisture and thickness can impact pressure values sensed at the nip 1201 as the regions of the web of material 904 with different amounts of moisture enter a region of the nip 1201 concurrently with a sensor 26A. Thus, the variations in the felt 911 impact pressure values sensed in a region of the nip 1201.

In addition to the time-based technique described above for identifying different tracking segments, alternative techniques are contemplated as well. For example, the rotating felt 911 could include multiple, evenly-spaced marks that could be detected (e.g., optically) as each such mark passes a sensor location. The marks would function so as to separate the felt 911 (or 913) into different segments and a counter, or similar circuitry, would increment a count each time a mark was detected so that any collected data could be associated with one of the segments of the felt 911. A reference mark could be distinctive from all the other marks such that when the sensor detects the reference mark, the counter circuitry resets and starts counting from an initial value (e.g., "0" or "1"). As an example, each evenly-spaced mark could be a single tick mark, a tick mark of a particular width, or a mark of a particular color. The reference mark could be a double-tick mark, a thicker (or thinner) tick mark, or a mark of a unique color. If the techniques of segmenting the felt 911 just described were utilized, then it would be unnecessary to explicitly measure an elapsed time since the most recent generation of a reference timing signal that is generated each revolution of the felt 911. The detectable marks can, for example, be optically detectable, magnetically detectable, detectable using infra-red radiation, detectable using sonic waves, detectable using X-rays, or detectable based on radioactive emissions.

Figure 12B:
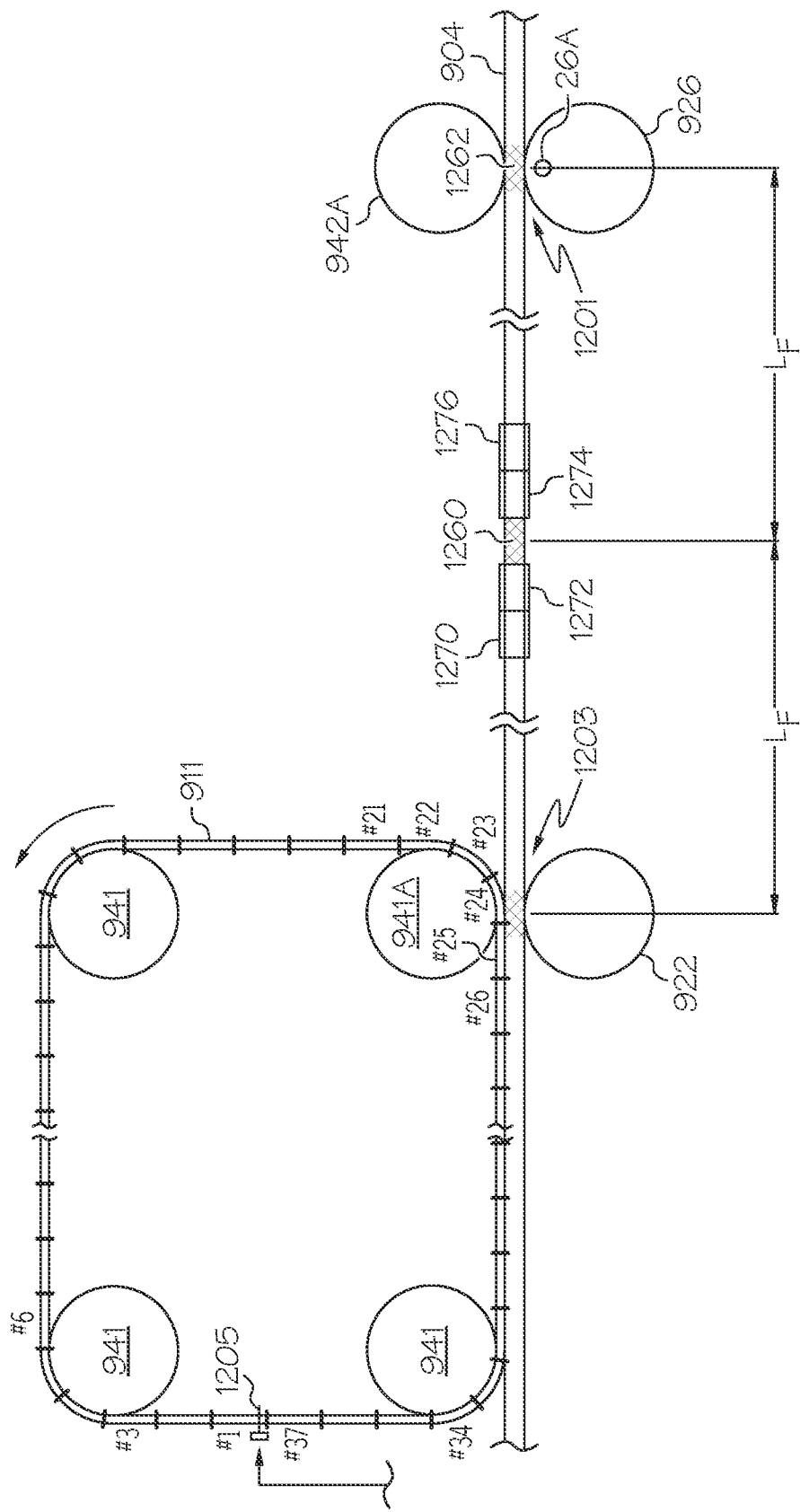

FIG. 12B provides an exemplary method for relating a time-based tracking segment of the felt 911 to a corresponding physical circumferential tracking segment on the felt 911. Felts, such as 911 and 913 can vary in length, or circumference, between 50 to 300 feet for example. In an example embodiment, the diameter of the sensing roll 926 is 2 feet which makes its circumference approximately 6.28 feet. Felt 911 has, in this example, 37 physical circumferential segments each being equivalent in length to the circumference of the sensing roll 926. Thus, the felt 911 is a little more than 232 feet in length, $L_F$. The felt 911 also rotates as a continuous band around the rolls 941 with a period of rotation p. In a simple example, the region of the nip 1201 is located downstream a distance from the region of the nip 1203 that is an integer multiple of the felt length $L_F$. As FIG. 12B shows, when the reference location 1205 is at its position to generate a new time reference signal, there is a segment (e.g., segment #24) that is touching the web of material 904. In the illustrated embodiment, because segment #24 is the only felt segment ever in the nip 1203 each time a new time reference signal is generated, it is designated as a "felt touch reference segment." There are also two other regions 1260, 1262 shown on the web of material 904 that were previously in the region of the nip 1203 concurrently with the "felt touch reference segment" #24. That is, the web material region 1260 was in the region of the nip concurrently with the "felt touch reference segment" #24 during one prior rotation of the felt 911 and the web material region 1262 was in the region of the nip concurrently with the "felt touch reference segment" #24 during two prior rotations of the felt 911.

Relative to the web of material region 1260 and subsequent to the region 1260 being in the nip 1203, there is an adjacent web of material region 1272 that was in the region of the nip 1203 concurrently with circumferential segment #25 of the felt 911 and adjacent that region 1272 is a web of material region 1270 that was in the region of the nip 1203 with circumferential segment #26 of the felt 911. Ahead of the web of material region 1260, there is an adjacent region 1274 of the web of material that was in the region of the nip 1203 concurrently with circumferential segment #23 of the felt 911 and a web of material region 1276 was in the region of the nip 1203 concurrently with circumferential segment #22 of the felt 911. Each web of material region 1260, 1270, 1272, 1274, 1276 has a length of $1/37^{th}$ of the length $L_F$ of the felt 911 corresponding to a time period $\rho/37$ long.

In FIG. 12B, at the sensing roll 926, the region 1262 of the web of material 904 is shown in the region of the nip 1201 with the sensor 26A. Based on the reference signal from the generator 900B, which in the illustrated embodiment is always generated concurrently with the felt touch reference segment #24 of the felt 911 being in the nip 1203, the sensed reading of the sensor 26A on the sensing roll 926 occurs during a first time-based period tracking segment (e.g., ($0 \leq t < 1/37 * \rho$)), which first time-based period tracking segment starts concurrently with the generation of the reference signal by the generator 900B and the value "t" represents an amount of time since generation of that reference signal. If the sensor 26A, however, was in a position to arrive in the nip 1201 during the next time-based segment of the period of rotation of the felt 911, x=2, then the reference location 1205 would have moved by a distance equal to one circumferential segment of the felt 911 and the web of material 904 would have moved forward substantially the same distance so that a region just behind region 1262 (and analogous to region 1272) would have entered the region of the nip 1201. Accordingly, if the sensed reading occurs during the second time period tracking segment (e.g., ($1/37*\rho \leq t < 2/47*\rho$)), then the region of the web of material 904 that is in the region of the nip 1201 was also previously in the region of the nip 1203 concurrently with the circumferential tracking segment #25 of the felt 911.

Accordingly, each time-based tracking segment can be easily correlated to a physical circumferential tracking segment of the felt 911. If the reading of the sensor 26A on the sensing roll 926 takes place between $$\left(\frac{x-1}{37}*\rho \leq t < \frac{x}{37}*\rho\right),$$

wherein "x" is the index value of a time-based tracking segment of the rotational period of the felt 911 measured from the last generated reference signal from the generator 900B, which time-based tracking segment occurs concurrently with the sensor 26A being in the region of the nip 1201, then the region of the web of material 904 in the region of the nip 1201 was also previously in the region of the nip 1203 concurrently with the physical circumferential segment of the felt 911 indexed by an index value q, where q=((# of felt touch reference segment (i.e., #24 in the illustrated embodiment))+(x−1)) as measured from the reference location 1205. This index value would, of course wrap around to begin again at "1" when it exceeds "37", the number of physical circumferential segments.

FIG. 12C illustrates a slight modification to the arrangement of FIG. 12B in which the region of the nip 1201 happens to be, for example purposes, a distance from the region of the nip 1203 that is not an integer multiple of the length $L_F$ of the felt 911. As compared to the arrangement of FIG. 12B, the distance between the region of the nip 1201 and the region of the nip 1203 in FIG. 12C has an additional span or distance y. In the illustrated embodiment, the amount of time it takes the web of material 904 to travel the extra distance y equals ($10/37*\rho$). A sensor reading from the region of the nip 1201 occurring during the first time-based tracking segment ($0 \leq t < 1/37*\rho$) will involve a region of the web of material 904 that was also previously in the region of the nip 1203 concurrently with the circumferential segment #14 (e.g., 10 time segments before the "felt touch reference segment" (i.e., #24 in the illustrated embodiments of FIGS. 12B and 12C) was in the region of the nip 1203. So, more generally:

a) if the distance between the region of the nip 1201 and the region of the nip 1203 is greater by a span y than a multiple integer of the length of the felt 911 (wherein the units of measure for y is in terms of physical circumferential tracking segments), and b) if the sensor reading takes place at a time, t, wherein $$\left(\frac{x-1}{37}*\rho \leq t < \frac{x}{37}*\rho\right),$$

then the region of the web of material 904 in the region of the nip 1201 was also previously in the region of the nip 1203 concurrently with physical circumferential tracking segment of the felt 911 indexed by the index value q, where q=((# of felt touch reference segment)+(x−1)−y) as measured from the reference location 1205. Thus, the data (e.g., sums, counts, averages) segregated into 37 time-based tracking segments can be translated into 37 circumferential tracking segments as well.

Thus, the felt 911, or more generally a continuous band, can comprise m (e.g., m=37) physical circumferential tracking segments relative to a reference location on the continuous band, each having a respective, unique index value q in the range of 1, 2, ... , m, wherein each of the m time-based tracking segments can be associated with a corresponding one of m physical circumferential tracking segments. As described above, the index value x of a particular time-based tracking segment can be calculated independently from calculating the index value q of the corresponding circumferential tracking segment (i.e., calculating x of a time-based tracking segment does not depend on first determining q of a corresponding physical circumferential segment).

Additionally, referring back to FIG. 12B and the equation above, each physical circumferential tracking segment #1-#37 of the felt 911 contacts the web of material 904 at an upstream location from the region of the nip 1201; and the index value q of each physical circumferential tracking segment #1-#37 can be calculated based on a) a distance between the region of the nip 1201 and the upstream location (e.g., the nip 1203), and b) the index value x of the corresponding time-based tracking segment. More specifically, one particular circumferential tracking segment contacts the web of material 904 at the upstream location substantially concurrently with the signal generator generating the trigger signal and can be considered a felt touch reference segment, and the index value q of each circumferential tracking segment (e.g., #1-#37) can be calculated based on a) a distance between the region of the nip 1201 and the upstream location (e.g., nip 1203), b) the index value of the one particular circumferential tracking segment (e.g., #24, the felt touch reference segment), and c) the index value x of a corresponding time-based tracking segment. In each of the two scenarios for calculating a particular physical circumferential segment index value, q, based on a time-based tracking segment index value, x, just described, a distance between the region of the nip 1201 and the upstream location (e.g., nip 1203) was used in the calculation. As described earlier, it may be beneficial to consider the distance between the region of the nip 1201 and the upstream location (e.g., the nip 1203) to be an integer multiple of the length $L_F$ of the felt 911 plus some additional span or distance y, wherein the unit of measure for y is in terms of physical circumferential tracking segments.

Figure 12D:
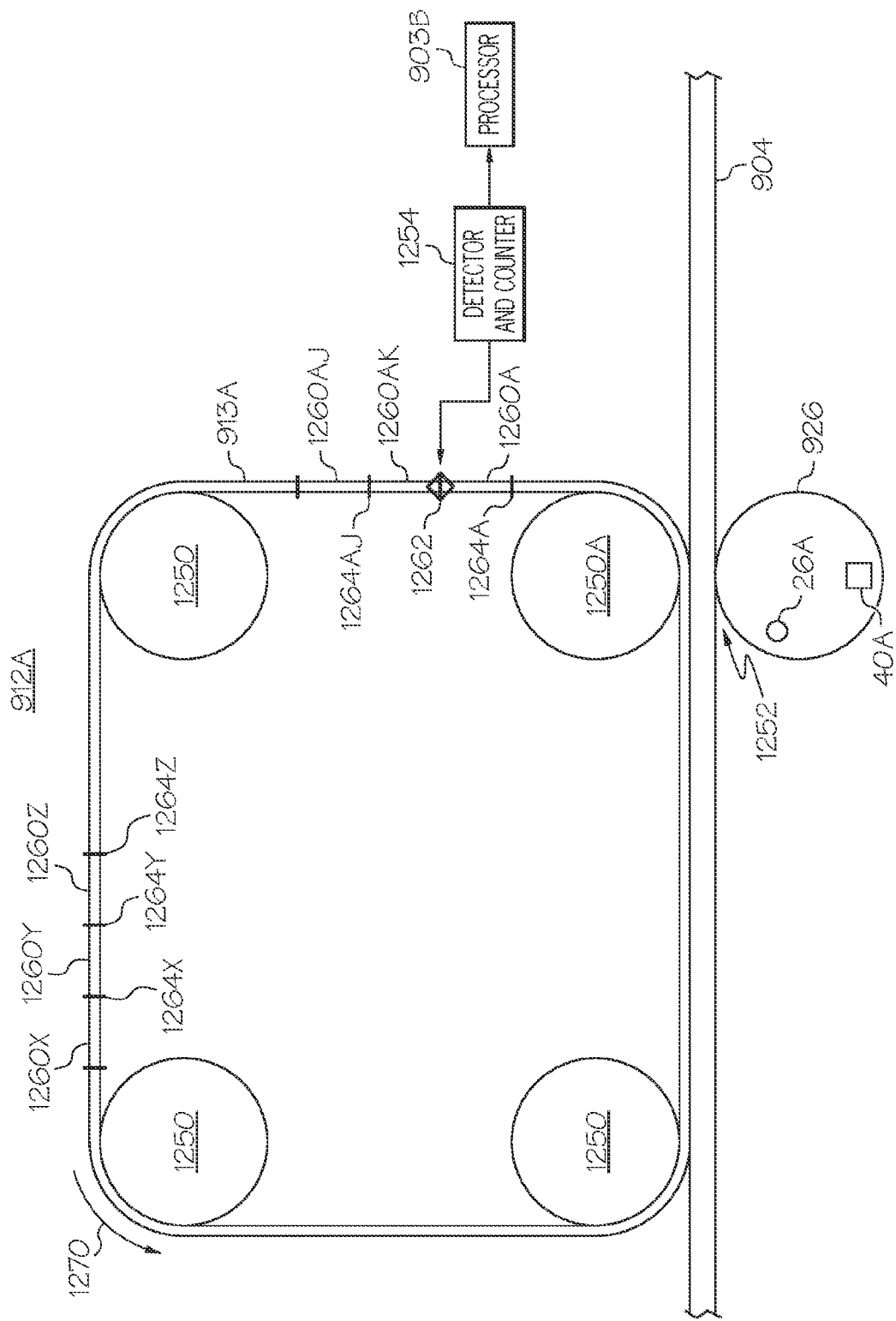
Figure 12E:
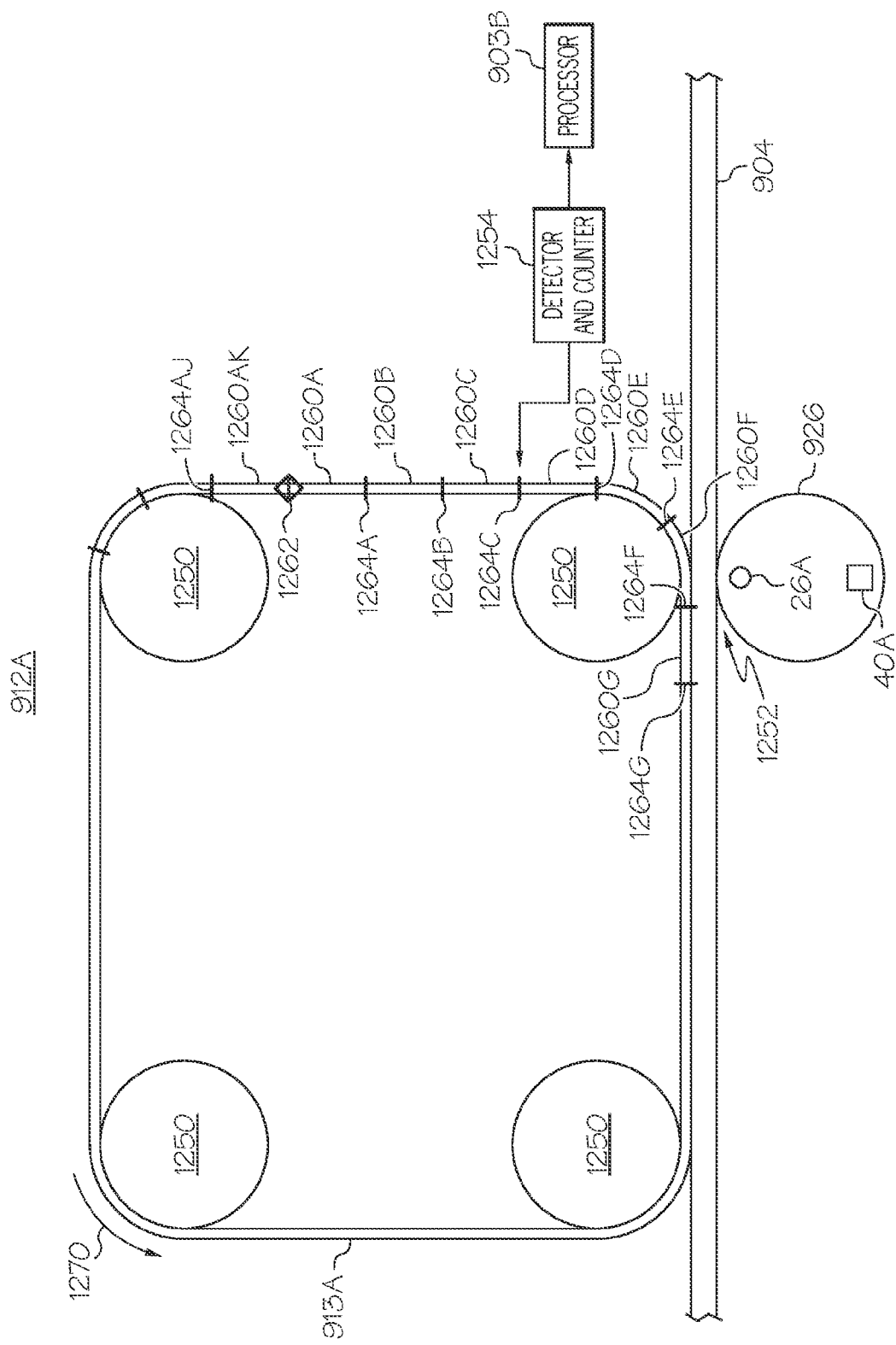

In addition to the time-based technique described above for identifying different tracking segments, alternative techniques are contemplated as well. FIGS. 12D, 12E and 12F illustrate an alternative wet felt station 912A with a wet felt 913A traveling around four rollers 1250 in a direction shown by arrow 1270. In this alternative wet felt station 912A, attributes of the felt 913A are used to determine tracking segments. For example, the rotating felt 913A could include multiple, evenly-spaced marks that could be detected (e.g., optically) and counted as each such mark passes a location of a sensor or detector 1254. Each time one of the marks travels by and is detected by the sensor or detector 1254, the detection of the mark could be considered an "event." Thus, the detector 1254 can also include counter circuitry that communicates with a processor 903B and counts or tracks the events that occur. The marks could also be metallic wires or threads that are detectable with magnets or similar switches. The marks would function so as to separate the felt 913A (or the felt 911) into different segments and a counter, or similar circuitry, would increment a count each time a mark was detected (e.g., an event) so that any collected data could be associated with one of the segments of the felt 913A. It is also contemplated that the marks may not be evenly spaced.

In FIG. 12D, the felt 913A may have 37 physical circumferential segments 1260A-1260AK, of which, segments 1260A, 1260X, 1260Y, 1260Z, 1260 AJ and 1260AK are explicitly referenced in FIG. 12D. Separating each physical circumferential segment 1260 is a mark 1264 (e.g., marks 1264A, 1264X, 1264Y, 1264Z, 1264AJ are explicitly shown in FIG. 12D). A reference mark 1262 could be distinctive from all the other marks 1264A-1264AJ such that when the detector 1254 senses the reference mark 1262, the counter circuitry 1254 resets and starts counting from an initial value, or "starting count," (e.g., "0" or "1"). Alternately, the reference marks can all be unique and specifically mark certain positions on the felt.

In the wet felt station 912A, one of the rollers 1250 forms a nip 1252 with a sensing roll 926 that has a wireless device 40A for communicating with the processor 903B and an array of sensors 26A (e.g., 14 sensors) spaced axially along the sensing roll 926. When the sensor 26A in one of the axially positions on the sensing roll 926 enters a region of the nip 1252 and senses a pressure reading, then that pressure value can be count synchronized with the rotation of the wet felt 913A by associating the sensor readings at that axial position with a current value of the counter 1254. When the marks 1264 are spaced an equal distance apart circumferentially, the pressure value can also be considered to be time synchronized with the rotation of the felt 913A by associating the sensor reading at that axial position with a current value of the counter 1254.

Each time the distinctive reference mark 1262 is detected by the detector 1254, a starting reference signal can be generated that is associated with each rotation of the wet felt 913A. The starting reference signal may, for example, be resetting the value of the counter 1254 to a starting count such as, for example, "1". Whenever a pressure reading is sensed by the sensor 26A in the region of the nip 1252, the number of tick mark counts, or the number of events, detected by the detector/counter 1254 since that most-recent starting reference signal, or the starting count, is an indication of an amount the wet felt 913A has rotated around its loop pattern between when the counter 1254 was reset and the pressure reading in the region of the nip 1252 occurred. Accordingly, each count (e.g., "1", "2", . . . "37") can be associated with one of a plurality of count-based tracking segments wherein each count-based tracking segment is associated with a different physical circumferential segment 1260A-1260AK of the wet felt 913A in one embodiment of the present invention. In the illustrated embodiment, each count-based tracking segment is equal to the count or value of the counter. If the tick marks 1264 are evenly spaced, then the count-based tracking segments can correspond to time-based tracking segments of the period of rotation of the wet felt 913A or correspond to physical circumferential segments of the wet felt 913A.

Similar to the techniques described above that involved time synchronizing sensor readings for each axially-spaced sensor 26A with one of 37 possible time-based tracking segments, associating each of these sensor readings with one of 37 count-based tracking segments, when the marks 1264 are evenly spaced apart, also time synchronizes the pressure data with the rotation of the wet felt 913A.

In the example embodiment of FIG. 12D, the wet felt 913A travels along with the web of material 904 through the nip 1252 formed with the sensing roll 926. In such an embodiment, a particular value of the detector/counter 1254 when a corresponding one particular physical circumferential segment (e.g., 1260A-1260AK) of the wet felt 913 is in the region of the nip 1252 is associated with one of the plurality of count-based tracking segments. As noted above, each count-based tracking segment corresponds to a different physical circumferential segment 1260A-1260AK of the wet felt 913A. Hence, when a sensor reading is generated by one of the axially spaced apart sensors, the processor 903B associates that sensor reading with a current value of the counter 1254, associates the count generated by the counter 1254 with a corresponding count-based tracking segment and stores that sensor reading with a tracking segment corresponding to the count generated when sensor reading occurred.

FIG. 12E illustrates the felt 913A of FIG. 12D after it has rotated to a different position and the sensor 26A generates a sensed pressure signal of the region of the nip 1252. In particular, the felt 913A has rotated an amount such that the tick marks 1262, 1264A, 1264B and 1264C have been detected and counted by the detector/counter 1254. Thus, if the counting of the tick marks starts with "1" as the distinctive tick mark 1262 is detected, an example count for the position of the felt 913A of FIG. 12E would be "4" when the sensor reading from sensor 26A is captured. This count value would correspond to one of the 37 (for example) tracking segments that each of the sensor readings will be associated with and each such tracking segment (or count value) would correspond to a different physical circumferential segment 1260A-1260AK of the wet felt 913A. As shown in FIG. 12E, corresponding to this count value of "4", the physical circumferential segment 1260F of the felt 913A is in the region of the nip 1252. Accordingly, a plurality of sensed pressure readings from the region of the nip 1252 associated with the tracking segment, or count reading, of "4" could all be associated with the physical circumferential segment 1260F of the felt 913A. Continuing with the example of FIG. 12E, when the felt rotates such that the tick mark 1264D is detected and counted, the tracking segment, or count value, will be "5" and will correspond to pressure readings sensed when physical circumferential segment 1260G is in the region of the nip 1252.

The embodiment of FIG. 12A could be modified as well such that the felt 911 includes tick marks and the wet felt station 910 includes a counter/detector instead of the time-based-signal generator 900B. The pressure readings sensed in the region of the nip 1201 could by count synchronized with the rotation of the wet felt 911 based on a count value rather than an elapsed time. Thus, the count-based tracking segment determination and count synchronization described with respect to FIG. 12D could be applied to either a felt that travels through a nip where pressure values are sensed or a felt that is upstream from the nip where the pressure values are being sensed.

FIG. 12F depicts a portion of the wet felt 913A that is traveling around in a loop pattern in a direction shown by the arrow 1270. The portion of the felt 913A in FIG. 12F shows a distinctive reference mark 1262 and four other nearby marks 1264A, 1264B, 1264AJ and 1274AI that are evenly space relative to circumferential segments 1260A, 1260B, 1260AJ, and 1260AK of the wet felt 913A. As an example, each evenly-spaced mark could be a single tick mark (e.g., 1264A, 1264B, 1264AI and 1274AJ), a tick mark of a particular width, or a mark of a particular color. The distinctive reference mark 1262 could be a double-tick mark, a thicker (or thinner) tick mark, or a mark of a unique color. Such tick marks can also be used to encode positional information (such as the numbers 1 to 37) associated with each segment. If the techniques of segmenting the felt 913A (or 911) just described were utilized, then it would be unnecessary to explicitly measure an elapsed time since the most recent generation of a reference timing signal that is generated each revolution of the felt 913A; instead, detection and counting of tick marks (e.g., 1264A-1264AJ) since the distinctive reference mark 1262 could be used to define a plurality of count-based tracking segments.

The position of the marks, 1262, 1264A, 1264B, 1264AJ, and 1264AK in FIG. 12F is provided merely by way of example. They can extend along the entire axial width of the felt 913A, be localized next to one or both edges of the felt 913A, or be located in the middle of the felt 913A. They are located such that they can be detected by the detector/counter 1254 as the felt 913A travels past a location proximate to the detector/counter 1254.

One of ordinary skill in this technological field will recognize that identifiable tick marks or other types of markings can be provided in a variety of different ways without departing from the scope of the present invention. For example, each mark may be encoded such that each is uniquely identifiable. An appropriate sensor would, therefore, not necessarily "count" the tick marks but merely identify which tick mark is presently passing by the sensor. Thus, each tick mark could be associated with or define a value, possibly a unique value, that can be sensed between when a most recent starting reference was generated and when a sensor (e.g., 26A) enters a region of a nip where a pressure reading, or other reading, is being sensed. Accordingly, one of a plurality of tracking segments associated with the continuous band can be identified based on this value.

In addition to being on a surface of one of the felts, the tick marks, or similar marks or openings, could be included on a disk coupled to a rotating shaft or on the shaft itself associated with one of the multiple rotating components that help drive the felt around its continuous loop. Such an arrangement may be used to provide a rotary encoder beneficial in identifying respective tracking segments of a felt or other continuous band. As one example, a shaft encoder of this type could provide a value that corresponds to a count of the number of tick marks or openings that were detected between when a most recent starting reference was generated and when a sensor (e.g., 26A) enters a region of a nip where a pressure reading, or other reading, is being sensed. Accordingly, one of a plurality of tracking segments associated with the continuous band can be identified based on this value.

In addition to the above examples, each respective tracking segment of a continuous band, which could be either time-based segments of a period of rotation of the band or physical circumferential segments of the band, can also correspond to a value that occurs between when a most recent starting reference was generated and when a sensor (e.g., 26A) enters a region of a nip where a pressure reading, or other reading, is being sensed. Each such tracking segment could correspond to a different value such as, for example, an index number of the tracking segment as measured from a reference such as a time-based reference signal or a reference location or position of the band.

Returning to the felt 911 of FIG. 12A, the felt 911 can be segmented into cross-machine direction (or axial) segments similar to the felt 913 being segmented into axial segments corresponding to the different locations of the sensors 26A on the sensing roll 926. Thus, the felt 911 can be broken into multiple axial segments that each correspond to one of the sensor locations on the sensing roll 926 and data similar to that of FIGS. 14A-14C can be collected for each axial segment. Accordingly, similar matrices of "counts", "sums" and "averages" as described in FIGS. 6-8 can be constructed for the data similar to FIGS. 14A-14C for each axial segment but arranged in a manner time-synchronized with the period of rotation of the felt 911. In the example provided above, each such matrix would have (37×14), or 518, cells because the felt 911, or more generally a continuous band, comprises n axial segments, having respective index values: 1, 2, . . . , n (e.g., n=14) and the felt rotational period comprises m time-based tracking segments, each having a respective, unique index value x in the range of: 1, 2, . . . , m (e.g., m=37) which creates (n times m) unique permutations that are identifiable by a two-element set comprising a respective axial segment index value and a respective time-based tracking segment index value. So, as mentioned above, for a plurality of respective sensor signals and for one or more of the possible (n times m) permutations, each cell of a matrix can be calculated that represents an average of all the plurality of respective sensor signals associated with an axial segment and time-based tracking segment matching each of the one or more permutations.

The pressure readings in column 404A of FIGS. 14A-14C involve less than only 100 different sensor readings from one sensor 26A. However, if data from over 1000, 2000 or even 5000 sensor readings from each of the sensors in a sensing roll is collected, then the time-synchronization of data can reveal effects that different stations, e.g., wet felt stations 908, 910 and 912, in the process/system line of FIG. 9 can have on those pressure readings. The values in column 404A correspond to different sequential sensor readings as numbered in column 402A. However, depending on how those pressure reading values are associated with periodically repeating tracking segments, patterns in the pressure readings may become apparent.

As shown by element 1412 in column 406A, there can be 22 mating roll tracking segments such that each pressure reading (from column 404A) is associated with one of those tracking segments. As described earlier with respect to the matrices of FIGS. 6-8, each sensor reading in column 404A can be associated with only one axial position (or sensor position of the one sensor generating those pressure readings) and any one of a number of tracking segments (e.g., 1-22) of a monitored component in the process/system of FIG. 9. In the following discussion, an assumption is made that the example axial segment is "Axial Segment #1". Every pressure reading in column 404A that is associated with mating roll tracking segment 1 is added together. The number of those segments can then be divided into the sum to arrive at an average pressure reading for tracking segment 1. A similar average can be calculated for each of the 21 other mating roll tracking segments as well. Similar averages can be calculated for all of the 21 mating roll tracking segments corresponding to the remaining axial segments, i.e., Axial Segment #2 through Axial Segment #14. Thus, an average pressure matrix, such as the one described with respect to FIG. 8, can be constructed for the mating roll 942A.

Figure 15A:
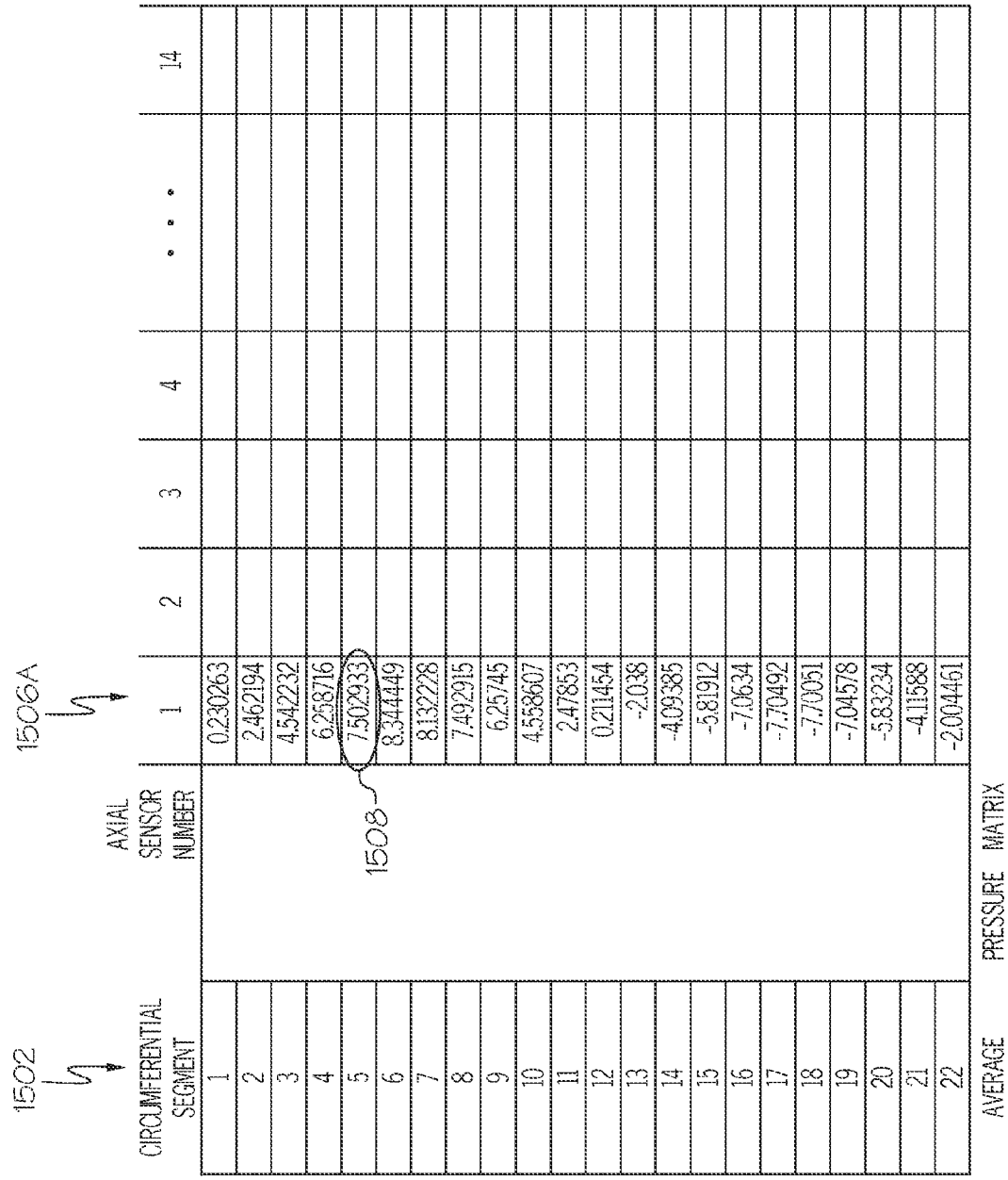

FIG. 15A illustrates an average pressure matrix for the mating roll 942A constructed by extending the simulation data of FIGS. 14A-14C to 5,000 pressure readings. Column 1502 represents the tracking segments of the mating roll 942A with each row representing one of those 22 tracking segments. Each column 1506 represents one of the axial positions of the sensors 26 (for example, 14 axial positions). The extended pressure reading data in column 404A of FIGS. 14A-14C represents one particular axial position such as "Axial Segment 1" and, thus, is used to calculate the value in a single column 1506A of the matrix of FIG. 15A. A value 1508 in row 5 of the matrix is an average of all the pressure readings of column 404A that are associated with tracking segment 5 of the mating roll 942A.

FIG. 15B illustrates an average pressure matrix for the felt 913 constructed by extending the simulation data of FIGS. 14A-14C to 5,000 pressure readings. Column 1512 represents the tracking segments of the felt 913 with each row representing one of those 31 tracking segments. Each column 1516 represents one of the axial positions of the sensors 26. The extended pressure reading data in column 404A of FIGS. 14A-14C represents one particular axial position such as "Axial Segment 1" and, thus, is used to calculate the value in a single column 1516A of the matrix of FIG. 15B. A value 1518 in row 27 of the matrix is an average of all the pressure reading of column 404A that are associated with tracking segment 27 of the felt 913. In particular, the average value in row 27 is significantly higher than the values in the other rows of column 1516 and could represent a defect of the felt 913 such as a plugged spot that is periodically causing lower water removal.

FIG. 15C illustrates an average pressure matrix for the felt 911 constructed by extending the simulation data of FIGS. 14A-14C to 5,000 pressure readings. Column 1522 represents the time-based tracking segments of the felt 911 with each row representing one of those 37 tracking segments. Each column 1526 represents one of the axial positions of the sensors 26. The extended pressure reading data in column 404A of FIGS. 14A-14C represents one particular axial position such as "Axial Segment 1" and, thus, is used to calculate the value in a single column 1526A of the matrix of FIG. 15C. A value 1528 in row 25 of the matrix is an average of all the pressure reading of column 404A that are associated with time-based tracking segment 25 of the felt 911. The time-based tracking segment 25 does not necessarily correspond to physical circumferential tracking segment 25 of the felt 911 being in the nip 1203 concurrently. However, as described above, the physical circumferential segment of the felt 911 in the nip 1203 corresponding to the time-based tracking segment 25 can be calculated. In particular, the average value in row 25 is approximately 2 psi higher than many of the values in the other rows and could represent a defect in the felt 911, such as a region of the felt 911 that is plugged or a thin spot of the felt 911 that does not remove water as readily as surrounding areas of the felt 911, that is periodically affecting the web of material 904.

Figure 16:
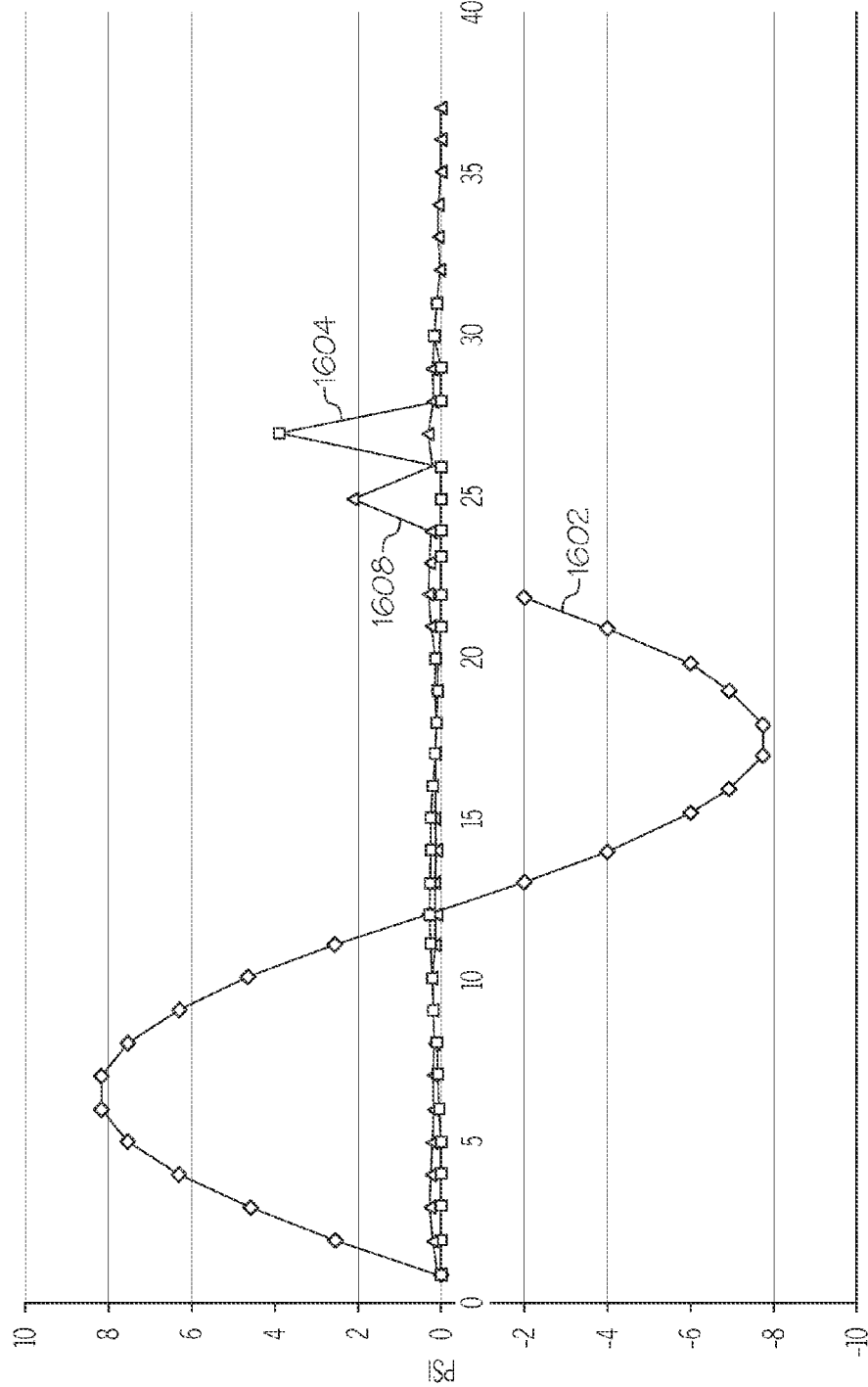
FIG. 16 illustrates different time-synchronized arrangements of the same sensor data readings in accordance with the principles of the present invention.

FIG. 16 illustrates graphically the different time-synchronized arrangements of the same sensor data readings in accordance with the principles of the present invention. In particular the waveforms of FIG. 16 represent the 5000 sensor readings taken by a single sensor 26A on the sensing roll 926 used to construct columns 1506A, 1516A and 1526A of the matrices of FIG. 15A-15C.

The waveform 1602 has the mating roll tracking segment index as its x-value and the corresponding average pressure reading from column 1506A of the matrix of FIG. 15A for that segment index as the y-value. The waveform 1604 has the felt tracking segment index of the felt 913 as its x-value and the corresponding average pressure reading from column 1516A of the matrix of FIG. 15B for that segment index as the y-value. The waveform 1608 has the felt 911 time-based tracking segment index as its x-value and the corresponding average pressure reading from column 1526A of the matrix of FIG. 15C for that segment index as the y-value. The peaks of the waveforms 1604 and 1608 correspond to the values 1518 and 1528 from FIG. 15B and FIG. 15C.

As mentioned above, the average pressure matrices, or their corresponding waveforms, can be analyzed to identify potential issues with one or more stations in the process/system of FIG. 9. The waveform 1602 reveals a sinusoidally changing pressure value based on which tracking segment of the mating roll 942A is traveling through the region of the nip 1201 at an axial location corresponding to pressure sensor 26A, which sensor 26A corresponds to Axial Segment 1. This, for example, could be caused by the mating roll 942A having an oval cross-sectional shape at that axial position, rather than a circular cross-section. The waveform 1604 reveals a significant pressure pulse associated with tracking segment #27 of the felt 913 at an axial location corresponding to pressure sensor 26A as compared to the other 30 tracking segments of the felt 913 at that axial location. The waveform 1608 reveals an identifiable pressure pulse associated with time-based tracking segment #25 of the period of rotation of the felt 911 at an axial location corresponding to pressure sensor 26A as compared to the 36 other tracking segments of the felt 911 at that same axial location.

Figure 13:
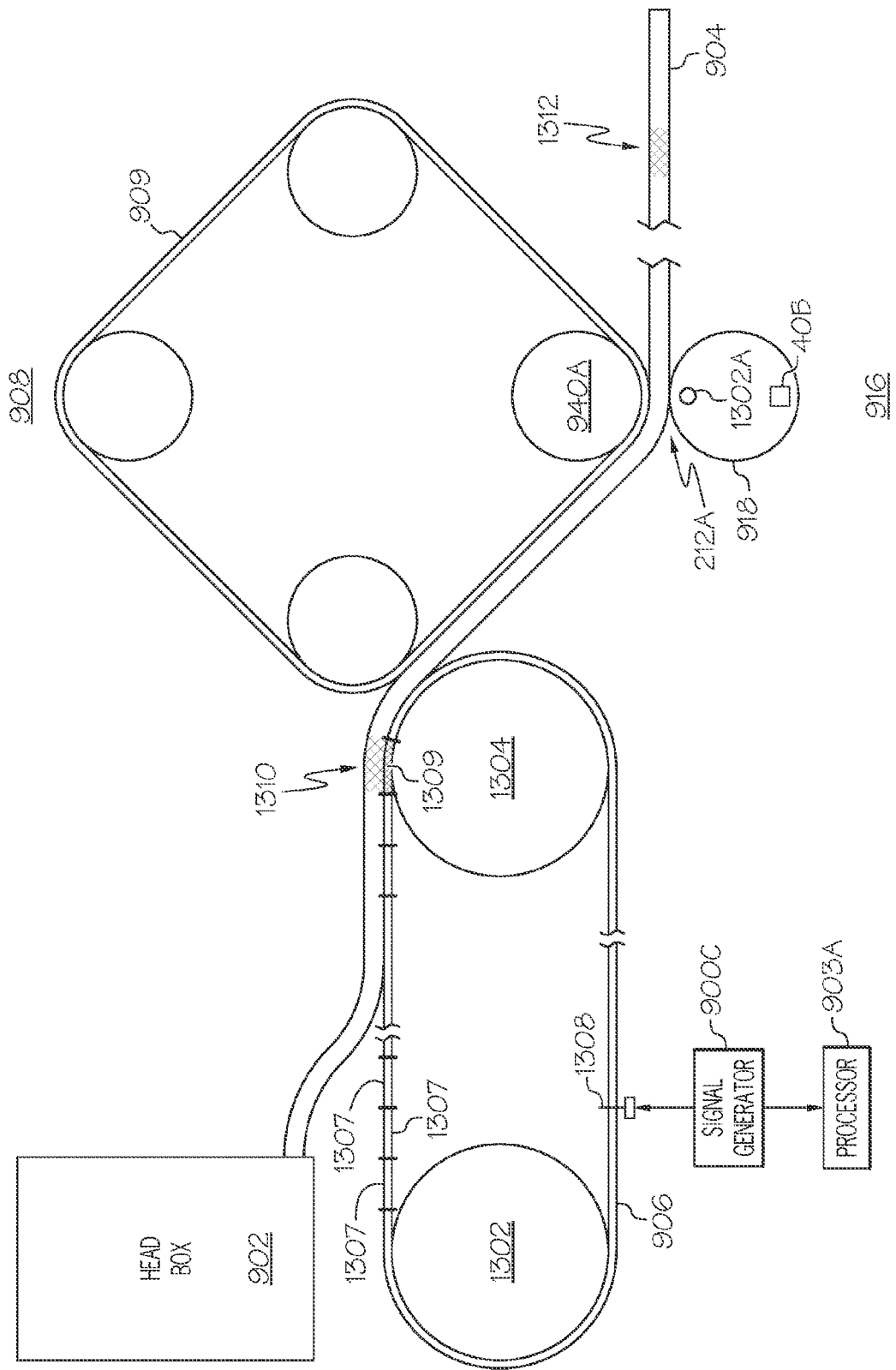
FIG. 13 illustrates a sensing roll associated with the nip of a pressing region of a felt station that is closest to and downstream from a wire mesh, in accordance with the principles of the present invention.

In FIG. 13, the sensing roll 918 is associated with a region of a nip 212A of the pressing region 916 of the felt station 908 that, in this example, is closest to the wire mesh 906. However, pressure values can be sensed at other, further downstream stations as well without departing from the scope of the present invention. Similar to the felts 911 and 913, the wire mesh 906 rotates as a continuous band in a loop pattern around rolls 1302 and 1304. Accordingly, the wire mesh 906 has a regular period of rotation around this loop pattern. Thus, different portions of the wire mesh 906 each periodically contact corresponding regions of the web of material 904 upstream from the region of the nip 212A even though the wire mesh 906 itself does not travel through the region of the nip 212A. The region of the nip 212A is formed between the sensing roll 918 and a mating roll 940A in the wet felt station 908. The sensing roll 918 includes a wireless transmitter 40B (substantially similar to the wireless devices 40, 40A described above) and a sensor array having a plurality of axially spaced apart sensors 1302 (substantially similar to each sensor 26 described above), with only a single sensor 1302A at one corresponding axial location illustrated in FIG. 13. In a similar manner to that described with respect to FIG. 5, a processor 903A receives signals from a signal generator 900C and the wireless device 40B in order to time synchronize sensor readings from the sensing roll 918 with the periodic time reference signal from the signal generator 900C. In the example embodiment of FIG. 13, a simple, single wire mesh 906 is described; however, other elements may be associated with the wire mesh 906 such as a top wire and/or a vertical former. One of ordinary skill will recognize that a variety of other elements can be associated with the wire mesh 906 of FIG. 13 such as additional rolls that contact an inner surface of the mesh 906 to carry the mesh 906 evenly and prevent it from sagging and vacuum boxes and foils (not shown) can be provided to pull moisture from the slurry through the mesh 906.

In FIG. 13, a portion 1309 of the wire mesh 906, having a corresponding axial and circumferential location, is shown that contacts the web of material 904 in a periodic manner as the web of material 904 is carried by the wire mesh 906. Identified web of material regions 1310 and 1312 are evenly spaced and were in contact with the portion 1309 of the wire mesh 906. When one of those web of material regions travels through the region of the nip 212A, the pressure reading from the sensing roll 918 can be affected by the impact that the wire mesh portion 1309 had on the web of material 904 that it contacted. Similar to the explanation relating to felts, the condition of the wire mesh 906 that contacts the web of material 904 can affect, for example, the amount of moisture that is able to drain from the contacted region of the web of material 904. Thus, some regions of the web of material 904 may be wetter or drier relative to one another and cause higher or lower pressure readings when passing through the region of the nip 212A. Changes to the web of material 904 are caused by gravity, vacuum and foils and vacuum pulling water from the slurry through the wire mesh 906. Both water weight (moisture) and dry weight of the slurry can be impacted. Plugs in the wire mesh 906 may cause solids of the slurry to shift position. Holes of worn areas in the wire mesh 906 may cause solids in the slurry to be lost and pass through the mesh 906 and result in a light weight region.

The wire mesh 906 can have a period of rotation that can be broken into different time-based tracking segments in the same manner as the period of rotation of the felt 911 was broken into 37 time-based tracking segments as described earlier which each could also be translated into a corresponding one physical circumferential tracking segment of the felt 911. Thus, the tracking segments related to the wire mesh 906 can either be a plurality of time-based segments of the period of rotation of the continuous band around the loop pattern or a plurality of physical circumferential segments on the continuous band. Segments 1307, as shown in FIG. 13, may, for example, be separate physical circumferential segments with each having an index relative to a fixed reference position 1308 on the wire mesh 906.

As an example, the reference position 1308 can make 1 complete rotation around the loop pattern in the same amount of time that the sensing roll 918 makes 43 rotations. For example, if the sensing roll 918 is about 6 feet in circumference, then in this example, the circumference of the wire mesh 906 would be about 258 feet (e.g., 6*43). Using the same principles as used when describing the felt 911 of FIG. 12A, the mesh 906 can be segmented into 43 tracking segments, for example. As an example, the portion 1309 of the wire mesh 906 that, for example, has a circumferential tracking segment and an axial location, may cause a pressure pulse in the region of the nip 212A as compared to all other portions of the wire mesh 906 if it is plugged or a pressure dip in the region of the nip 212A as compared to all other portions of the wire mesh 906 if it has a hole worn in it.

Thus, a signal generator 900C generates a periodic time reference signal when a reference position 1308 of the wire mesh 906 is adjacent the signal generator 900C. This is the reference signal from which a time-based tracking segment can be calculated as the sensor 1302A passes through the region of the nip 212A. As one example, when any of the web of material regions 1310 or 1312 passes through the nip 212A and is sensed, the processor 903A can determine the elapsed time period since the last reference signal was generated in a manner similar to that described above with respect to felt 911 in FIGS. 12B and 12C. Thus, the pressure readings sensed at those times can all be associated with the same time-based tracking segment of the period of rotation of the mesh 906. The portion 1309 of the wire mesh 906 that corresponds to this time-based tracking segment can be calculated in a manner similar to that described above with respect to felt 911 in FIGS. 12B and 12C. Thus, the pressure readings from the region of the nip 212A that are associated with different time-based tracking segments can also be associated with corresponding circumferential tracking segments of the mesh 906 relative to the reference position 1308.

In a manner similar to how data in FIGS. 4A and 4B, FIGS. 14A-14C and FIG. 15A-15C was collected in a manner time-synchronized with the rotational period of the mating roll 11, the felt 913, and the felt 911, sensor readings from the region of the nip 212A could also be collected in a manner time-synchronized with the period of rotation of the wire mesh 906. Also, similar to the tick marks and count-based tracking segments described in FIG. 12D and FIG. 12E with respect to the felt 913A, a similar count-based technique can be utilized with respect to the wire mesh 906 in order to collect sensor data in a manner time-synchronized with the rotation of the wire mesh 906.

Figure 17:
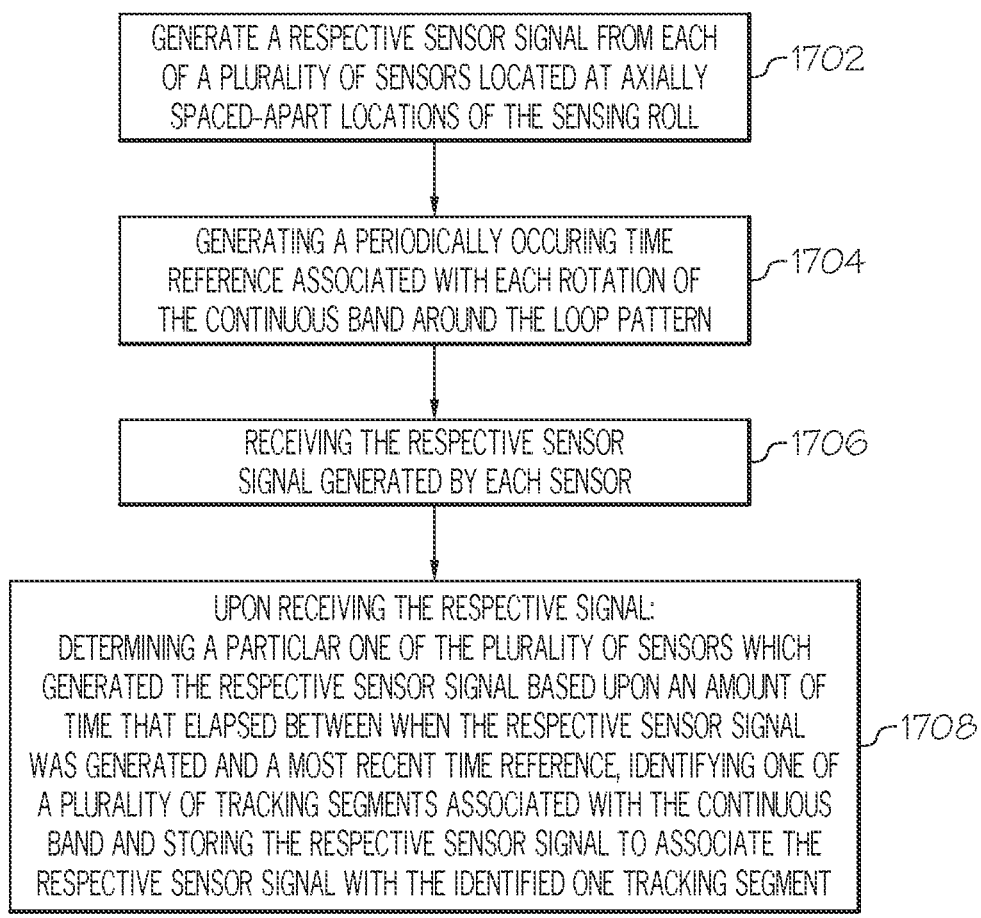
FIG. 17 is a flowchart of an exemplary method of time-synchronizing data in accordance with the principles of the present invention.

FIG. 17 is a flowchart of an exemplary method of time-synchronizing data in accordance with the principles of the present invention. In particular, the method can be associated with a sensing roll and possibly upstream felts and wires. The method begins in step 1702 by generating a respective sensor signal from each of a plurality of sensors located at axially spaced-apart locations of the sensing roll. More particularly, each respective sensor signal is generated when each sensor enters a region of a nip between the sensing roll and the mating roll during each rotation of the sensing roll. This is because the sensing roll and mating roll are located relative to one another to create the nip therebetween and there is also a web of material that travels through the nip from an upstream direction to a downstream direction. Furthermore there is a continuous band arranged to travel around in a loop pattern that contacts at least a region of the web of material at the nip or upstream from the nip. The method continues in step 1704 by generating a periodically occurring time reference associated with each rotation of the continuous band around the loop pattern. Next, in accordance with the method, the respective sensor signal generated by each sensor is received in step 1706. In step 1708, upon receiving the respective sensor signal, the method involves three different actions: a) determining a particular one of the plurality of sensors which generated the respective sensor signal, b) identifying one of a plurality of tracking segments associated with the continuous band based upon an amount of time that elapsed between when the respective sensor signal was generated and a most recent time reference, and c) storing the respective sensor signal to associate the respective sensor signal with the identified one tracking segment. Of particular note, each of the plurality of tracking segments is, respectively, associated with a different amount of elapsed time. In accordance with the method of FIG. 17, the continuous band can comprise either a press felt or a wire mesh. Furthermore, the continuous band may pass through the nip or merely contact a region of the web of material upstream from the nip.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A system associated with a sensing roll and a mating roll for collecting roll data comprising:
    the sensing roll and mating roll located relative to one another to create a nip therebetween, wherein a web of material travels through the nip from an upstream direction to a downstream direction and a continuous band, arranged to travel around in a loop pattern, contacts at least a region of the web of material upstream from the nip;
    a plurality of sensors located at axially spaced-apart locations of the sensing roll, wherein each sensor enters a region of the nip during each rotation of the sensing roll to generate a respective sensor signal;
    structure for generating a periodically occurring time reference associated with each rotation of the continuous band around the loop pattern; and
    a processor to receive the periodically occurring time reference and the respective sensor signal generated by each sensor and, after receiving the respective sensor signal, the processor operates to:
        determine a particular one of the plurality of sensors which generated the respective sensor signal,
        based upon an amount of time that elapsed between when the respective sensor signal was generated and a most recent time reference, identify one of a plurality of time-based tracking segments associated with the continuous band, wherein each of the plurality of tracking segments is, respectively, associated with a different amount of elapsed time, and
        store the respective sensor signal to associate the respective sensor signal with the identified one time-based tracking segment.

2. The system of claim 1, wherein the continuous band comprises a press felt.

3. The system of claim 1, wherein the continuous band comprises a wire mesh.

4. The system of claim 1, wherein the continuous band does not travel through the nip.

5. The system of claim 1, wherein the received sensor signal comprises a pressure value.

6. The system of claim 1, wherein the processor receives:
    the respective sensor signal for each of the plurality of sensors during each rotation of the sensing roll, and
    a plurality of the respective sensor signals occurring during a plurality of rotations of the sensing roll.

7. The system of claim 6, wherein, for each one of the plurality of the respective sensor signals, the processor identifies an associated continuous band axial segment and its identified one time-based tracking segment.

8. The system of claim 7, wherein:
    the continuous band comprises n axial segments, having respective index values: 1, 2, . . . , n;
    a continuous band rotational period comprises m time-based tracking segments, each having a respective, unique index value x in the range of: 1, 2, . . . , m, and
    wherein there are (n times m) unique permutations that are identifiable by a two-element set comprising a respective axial segment index value and a respective time-based tracking segment index value.

9. The system of claim 8, wherein, for the plurality of respective sensor signals and for one or more of the possible (n times m) permutations, the processor determines an average of all the plurality of respective sensor signals associated with an axial segment and time-based tracking segment matching each of the one or more permutations.

10. The system of claim 8, wherein the continuous band comprises:
    m circumferential tracking segments relative to a reference location on the continuous band, each having a respective, unique index value q in the range of: 1, 2, . . . , m, and, wherein
    each time-based tracking segment is associated with a corresponding circumferential tracking segment.

11. The system of claim 10, wherein the index value x of a particular time-based tracking segment is calculated independently from calculating the index value q of the corresponding circumferential tracking segment.

12. The system of claim 10, wherein:
each circumferential tracking segment of the continuous band contacts the web of material at an upstream location from the region of the nip; and
the index value q of each circumferential tracking segment is calculated based on a) a distance between the region of the nip and the upstream location and b) the index value x of the corresponding time-based tracking segment.

13. The system of claim 10, wherein the structure for generating a periodically occurring time reference comprises:
a signal generator to generate a trigger signal on each rotation of the continuous band as the reference location on the continuous band travels past a predetermined position.

14. The system of claim 13, wherein:
each circumferential tracking segment of the continuous band contacts the web of material at an upstream location from the region of the nip;
one particular circumferential tracking segment contacts the web of material at the upstream location substantially concurrently with the signal generator generating the trigger signal, and
the index value q of each circumferential tracking segment is calculated based on a) a distance between the region of the nip and the upstream location, b) the index value of the one particular circumferential tracking segment, and c) the index value x of the corresponding time-based tracking segment.

15. A system associated with a sensing roll and a mating roll for collecting roll data comprising:
the sensing roll and mating roll located relative to one another to create a nip therebetween, wherein a web of material travels through the nip from an upstream direction to a downstream direction and a continuous band, arranged to travel around in a loop pattern, contacts at least a region of the web of material upstream from the nip;
a plurality of sensors located at axially spaced-apart locations of the sensing roll, wherein each sensor enters a region of the nip during each rotation of the sensing roll to generate a respective sensor signal;
a signal generator to generate a periodically occurring time reference associated with each rotation of the continuous band around the loop pattern; and
a processor to receive the periodically occurring time reference and the respective sensor signal generated by each sensor and, after receiving the respective sensor signal, the processor operates to:
determine a particular one of the plurality of sensors which generated the respective sensor signal,
based upon the respective sensor signal and a time reference, identify one of a plurality of time-based tracking segments associated with the continuous band, and
store the respective sensor signal to associate the respective sensor signal with the identified one time-based tracking segment.

* * * * *